United States Patent
Nitta

(10) Patent No.: US 10,663,695 B2
(45) Date of Patent: May 26, 2020

(54) IMAGING LENS

(71) Applicant: KANTATSU CO., LTD., Yaita-shi, Tochigi (JP)

(72) Inventor: Koji Nitta, Tokyo (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 16/178,208

(22) Filed: Nov. 1, 2018

(65) Prior Publication Data
US 2019/0310443 A1 Oct. 10, 2019

(30) Foreign Application Priority Data

Nov. 1, 2017 (JP) ................................. 2017-211538

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| 9,417,434 | B1 * | 8/2016 | Huang ............... G02B 13/0045 |
| 2017/0315334 | A1 | 11/2017 | Liao et al. |
| 2018/0059377 | A1 | 3/2018 | Fukaya et al. |
| 2018/0188496 | A1 | 7/2018 | Hsieh et al. |
| 2018/0188505 | A1 | 7/2018 | Chang et al. |
| 2018/0259746 | A1 | 9/2018 | Fukaya et al. |
| 2019/0113715 | A1 | 4/2019 | Li et al. |

(Continued)

FOREIGN PATENT DOCUMENTS

| CN | 105353499 A | 2/2016 |
| CN | 106646833 A | 5/2017 |
| CN | 107121761 A | 9/2017 |

(Continued)

*Primary Examiner* — Joseph P Martinez
(74) *Attorney, Agent, or Firm* — Hamre, Schumann, Mueller & Larson, P.C.

(57) ABSTRACT

There is provided an imaging lens which satisfies demand of the wide field of view, the low-profileness and the low F-number and has excellent optical performance. An imaging lens comprises, in order from an object side to an image side, a first lens having positive refractive power and a convex surface facing the object side near an optical axis, a second lens having the convex surface facing the object side near the optical axis, a third lens, a fourth lens, a fifth lens, and a sixth lens having negative refractive power and a concave surface facing an image side near the optical axis, wherein the second lens has negative refractive power near the optical axis, the third lens has the negative refractive power near the optical axis, the fourth lens has the positive refractive power near the optical axis, and below conditional expressions are satisfied:

$$-3.00 < (D2/f2) \times 100 < -0.05$$

$$0.25 < (T4/f) \times 100 < 1.00$$

where
D2: thickness along the optical axis of the second lens,
f2: focal length of the second lens,
T4: distance along the optical axis from the image-side surface of the fourth lens to the object-side surface of the fifth lens, and
f: focal length of the overall optical system of the imaging lens.

17 Claims, 24 Drawing Sheets

(56) References Cited

U.S. PATENT DOCUMENTS

2019/0121063 A1  4/2019  Li et al.
2019/0170983 A1  6/2019  Li et al.

FOREIGN PATENT DOCUMENTS

| CN | 107219613 A | 9/2017 |
| CN | 107390350 A | 11/2017 |
| JP | 2017-187565 A | 10/2017 |
| JP | 2018-066978 A | 4/2018 |
| TW | 1616699 B | 3/2018 |

* cited by examiner

IMAGING LENS

The present application is based on and claims priority of a Japanese patent application No. 2017-211538 filed on Nov. 1, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in an increasingly compact and high-performance smartphone and mobile phone, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and to have high resolution performance. As a conventional imaging lens aiming high performance, for example, the imaging lens disclosed in Patent Document 1 (U.S. Pat. No. 9,417,434B) has been known.

Patent Document 1 discloses an imaging lens comprising, in order from an object side, a first lens having positive refractive power and a convex surface facing the object side near an optical axis, a second lens having negative refractive power, a third lens having the positive refractive power, a fourth lens having refractive power, a fifth lens having the negative refractive power, and a sixth lens having the positive refractive power and having a meniscus shape with a concave surface facing the object side.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, a convex surface, a concave surface or a plane surface of lens surfaces implies that a shape of the lens surface near an optical axis (paraxial portion). Refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object to an image plane. The total track length and a back focus is a distance obtained when thickness of an IR cut filter or a cover glass which may be arranged between the imaging lens and the image plane is converted into an air-converted distance An imaging lens according to the present invention comprises, in order from an object side to an image side, a first lens having positive refractive power and a convex surface facing the object side near an optical axis, a second lens having the convex surface facing the object side near the optical axis, a third lens, a fourth lens, a fifth lens, and a sixth lens having negative refractive power and a concave surface facing the image side near the optical axis.

The imaging lens having the above-described configuration achieves the wide field of view and the low-profileness by strengthening the refractive power of the first lens. The second lens properly corrects spherical aberration and astigmatism by having the convex surface facing the object side near the optical axis. The third lens properly corrects coma aberration, astigmatism and distortion. The fourth lens properly corrects the astigmatism, field curvature and the distortion while maintaining the low-profileness. The fifth lens properly corrects the astigmatism, the field curvature and the distortion. The sixth lens has the negative refractive power and the concave surface facing the image side near the optical axis, and therefore, a back focus can be secured while maintaining the low-profileness, and chromatic aberration, the distortion, the astigmatism and the field curvature can be properly corrected.

According to the imaging lens having the above-described configuration, it is preferable that the fifth lens mainly corrects aberrations, and various options for shapes near the optical axis are available. Namely, it is preferable that the fifth lens has the convex surface facing the object side near the optical axis or has the concave surface facing the object side near the optical axis. Furthermore, the fifth lens may have plane surfaces both on the object side and the image side near the optical axis.

When an object-side surface of the fifth lens has the convex surface facing the object side near an optical axis, such shape is advantageous for properly correcting the astigmatism and the field curvature. When the fifth lens has the concave surface facing the object side near an optical axis, light ray incident angle to the object-side surface of the fifth lens is appropriately controlled, and such shape is advantageous for correcting the coma aberration and high-order spherical aberration. When the fifth lens has the plane surfaces both on the object side and the image side near the optical axis, forming aspheric surface on both sides is advantageous for correcting the field curvature and the distortion.

According to the imaging lens having the above-described configuration, it is preferable that the object-side surface of the sixth lens has the convex surface facing the object side near the optical axis and is formed as the aspheric surface having at least one off-axial pole point, or the object-side surface of the sixth lens has the concave surface facing the object side near the optical axis and is formed as the aspheric surface having at least one off-axial pole point.

When the object-side surface of the sixth lens has the convex surface facing the object side near the optical axis and is formed as the aspheric surface having at least one off-axial pole point, the field curvature and the distortion can be properly corrected.

When the object-side surface of the sixth lens has the concave surface facing the object side near the optical axis and is formed as the aspheric surface having at least one off-axial pole point, the field curvature and the distortion can be properly corrected.

According to the imaging lens having the above-described configuration, it is preferable that a below conditional expression (1) is satisfied:

$$-3.00<(D2/f2)\times100<-0.05 \qquad (1)$$

where
D2: thickness along the optical axis of the second lens, and
f2: focal length of the second lens.

The conditional expression (1) defines an appropriate range of the thickness along the optical axis of the second lens. When a value is below the upper limit of the conditional expression (1), the thickness along the optical axis of the second lens is suppressed from being too small, and formability of the lens becomes excellent. On the other hand, when the value is above the lower limit of the conditional expression (1), the thickness along the optical axis of the second lens is suppressed from being too large, and an air gap of the object side and the image side of the second lens can be easily secured. As a result, the low-profileness can be maintained.

According to the imaging lens having the above-described configuration, it is preferable that a below conditional expression (2) is satisfied:

$$0.25<(T4/f)\times100<1.00 \qquad (2)$$

where
T4: distance along the optical axis from the image-side surface of the fourth lens to the object-side surface of the fifth lens, and
f: focal length of the overall optical system of the imaging lens.

The conditional expression (2) defines an appropriate range of the distance along the optical axis from the image-side surface of the fourth lens to the object-side surface of the fifth lens. By satisfying the conditional expression (2), the total track length can be shortened, and the coma aberration, the field curvature and the distortion are properly corrected.

According to the imaging lens having the above-described configuration, it is preferable that a below conditional expression (3) is satisfied:

$$0.15<vd5/vd6<0.70 \qquad (3)$$

where
vd5: abbe number at d-ray of the fifth lens, and
vd6: abbe number at d-ray of the sixth lens.

The conditional expression (3) defines an appropriate range of the abbe numbers at d-ray of the fifth lens and the sixth lens. By satisfying the conditional expression (3), the chromatic aberration is properly corrected.

According to the imaging lens having the above-described configuration, it is preferable that a below conditional expression (4) is satisfied:

$$-0.36<f1/f2<0.00 \qquad (4)$$

where
f1: focal length of the first lens, and
f2: focal length of the second lens.

The conditional expression (4) defines an appropriate range of refractive powers of the first lens and the second lens. When a value is below the upper limit of the conditional expression (4), the astigmatism and the distortion can be properly corrected. On the other hand, when the value is above the lower limit of the conditional expression (4), the positive refractive power of the first lens becomes appropriate and the low-profileness can be achieved.

According to the imaging lens having the above-described configuration, it is preferable that a below conditional expression (5) is satisfied:

$$0.4<(T3/f)\times100<14.0 \qquad (5)$$

where
T3: distance along the optical axis from the image-side surface of the third lens to the object-side surface of the fourth lens, and
f: focal length of the overall optical system of the imaging lens.

The conditional expression (5) defines an appropriate range of the distance along the optical axis from the image-side surface of the third lens to the object-side surface of the fourth lens. By satisfying the conditional expression (5), the total track length can be shortened, and the field curvature and the distortion can be properly corrected.

According to the imaging lens having the above-described configuration, it is preferable that the second lens has the negative refractive power near the optical axis, and more preferable that a below conditional expression (6) is satisfied:

$$-77.0<f2/f<-1.4 \qquad (6)$$

where
f2: focal length of the second lens, and
f: focal length of the overall optical system of the imaging lens.

When the second lens has the negative refractive power, the spherical aberration and the chromatic aberration can be properly corrected. Furthermore, the conditional expression (6) defines an appropriate range of refractive power of the second lens. When a value is below the upper limit of the conditional expression (6), the negative refractive power of the second lens becomes appropriate and the low-profileness can be achieved. On the other hand, when the value is above the lower limit of the conditional expression (6), the chromatic aberration, the spherical aberration and the distortion can be properly corrected.

According to the imaging lens having the above-described configuration, it is preferable that a below conditional expression (7) is satisfied:

$$1<|f3|/f<20 \qquad (7)$$

where
f3: focal length of the third lens, and
f: focal length of the overall optical system of the imaging lens.

The conditional expression (7) defines an appropriate range of the refractive power of the third lens. When a value is below the upper limit of the conditional expression (7), the chromatic aberration can be properly corrected. On the other hand, when the value is above the lower limit of the conditional expression (7), the spherical aberration, the astigmatism and the distortion can be properly corrected.

According to the imaging lens having the above-described configuration, it is preferable that a below conditional expression (8) is satisfied:

$$0.1<r1/r2<0.6 \qquad (8)$$

where
r1: paraxial curvature radius of the object-side surface of the first lens, and
r2: paraxial curvature radius of the image-side surface of the first lens.

The conditional expression (8) defines relationship between paraxial curvature radii of the object-side surface and the image-side surface of the first lens. By satisfying the conditional expression (8), the spherical aberration and the distortion can be properly corrected.

According to the imaging lens having the above-described configuration, it is preferable that a below conditional expression (9) is satisfied:

$$0.5 < r3/r4 < 3.0 \qquad (9)$$

where r3: paraxial curvature radius of the object-side surface of the second lens, and r4: paraxial curvature radius of the image-side surface of the second lens.

The conditional expression (9) defines relationship between paraxial curvature radii of the object-side surface and the image-side surface of the second lens. By satisfying the conditional expression (9), the astigmatism, the field curvature and the distortion can be properly corrected.

According to the imaging lens having the above-described configuration, it is preferable that a below conditional expression (10) is satisfied:

$$0.4 < |r2|/f < 2.6 \qquad (10)$$

where r2: paraxial curvature radius of the image-side surface of the first lens, and f: focal length of the overall optical system of the imaging lens.

The conditional expression (10) defines an appropriate range of the paraxial curvature radius of the image-side surface of the first lens. When a value is below the upper limit of the conditional expression (10), the astigmatism can be properly corrected. On the other hand, when the value is above the lower limit of the conditional expression (10), it is facilitated to suppress the spherical aberration occurred at this surface and to reduce sensitivity to manufacturing error while maintaining the refractive power of the image-side surface of the first lens.

According to the imaging lens having the above-described configuration, it is preferable that a below conditional expression (11) is satisfied:

$$0.25 < r3/f < 2.50 \qquad (11)$$

where r3: paraxial curvature radius of the object-side surface of the second lens, and f: focal length of the overall optical system of the imaging lens.

The conditional expression (11) defines an appropriate range of the paraxial curvature radius of the object-side surface of the second lens. When a value is below the upper limit of the conditional expression (11), the field curvature can be properly corrected. On the other hand, when the value is above the lower limit of the conditional expression (11), the spherical aberration can be properly corrected.

According to the imaging lens having the above-described configuration, it is preferable that composite refractive power of the third lens, the fourth lens, the fifth lens and the sixth lens is negative near the optical axis, and moreover, a below conditional expression (12) is satisfied:

$$f3456/f < -1.5 \qquad (12)$$

where f3456: composite focal length of the third lens, the fourth lens, the fifth lens and the sixth lens, and f: focal length of the overall optical system of the imaging lens.

When the composite refractive power of the third lens, the fourth lens, the fifth lens and the sixth lens is negative, the chromatic aberration can be properly corrected. The conditional expression (12) defines an appropriate range of the composite refractive power of the third lens, the fourth lens, the fifth lens and the sixth lens. When a value is below the upper limit of the conditional expression (12), the negative composite refractive power of the third lens, the fourth lens, the fifth lens and the sixth lens becomes appropriate, the low-profileness is achieved and the chromatic aberration can be properly corrected.

According to the imaging lens having the above-described configuration, it is preferable that a below conditional expression (13) is satisfied:

$$0.4 < f1/f4 < 2.1 \qquad (13)$$

where f1: focal length of the first lens, and f4: focal length of the fourth lens.

The conditional expression (13) defines relationship of refractive powers of the first lens and the fourth lens. When a value is below the upper limit of the conditional expression (13), the focal length of the fourth lens is suppressed from being too short, and position of Principal Point can be moved toward the object side. As a result, the low-profileness can be achieved, and the field curvature and the distortion can be properly corrected.

On the other hand, when the value is above the lower limit of the conditional expression (13), the focal length of the first lens is suppressed from being too short, and the spherical aberration and the coma aberration can be properly corrected.

According to the imaging lens having the above-described configuration, it is preferable that the fourth lens has the positive refractive power near the optical axis, and more preferable that a below conditional expression (14) is satisfied:

$$0.4 < f4/f < 2.0 \qquad (14)$$

where f4: focal length of the fourth lens, and f: focal length of the overall optical system of the imaging lens.

When the fourth lens has the positive refractive power, the low-profileness can be achieved. Furthermore, the conditional expression (14) defines an appropriate range of the refractive power of the fourth lens. When a value is below the upper limit of the conditional expression (14), the positive refractive power of the fourth lens becomes appropriate and the low-profileness can be achieved, and the chromatic aberration can be properly corrected. On the other hand, when the value is above the lower limit of the conditional expression (14), the spherical aberration, the coma aberration and the distortion can be properly corrected.

According to the imaging lens having the above-described configuration, it is preferable that a below conditional expression (15) is satisfied:

$$10 < T2/T4 < 38 \qquad (15)$$

where

T2: distance along the optical axis from the image-side surface of the second lens to the object-side surface of the third lens, and T4: distance along the optical axis from the image-side surface of the fourth lens to the object-side surface of the fifth lens.

The conditional expression (15) defines an appropriate range of an interval between the second lens and the third lens and an interval between the fourth lens and the fifth lens. By satisfying the conditional expression (15), difference between the interval of the second lens and the third lens and the interval of the fourth lens and the fifth lens is suppressed from being increased, and the low-profileness is achieved. Furthermore, by satisfying the conditional expression (15), the third lens and the fourth lens are arranged at an optimum position, and aberration correction function of the lenses becomes more effective.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9, 11, 13, 15, 17, 19, 21 and 23 are schematic views of the imaging lenses in Examples 1 to 12 according to the embodiments of the present invention, respectively.

Figure 1:
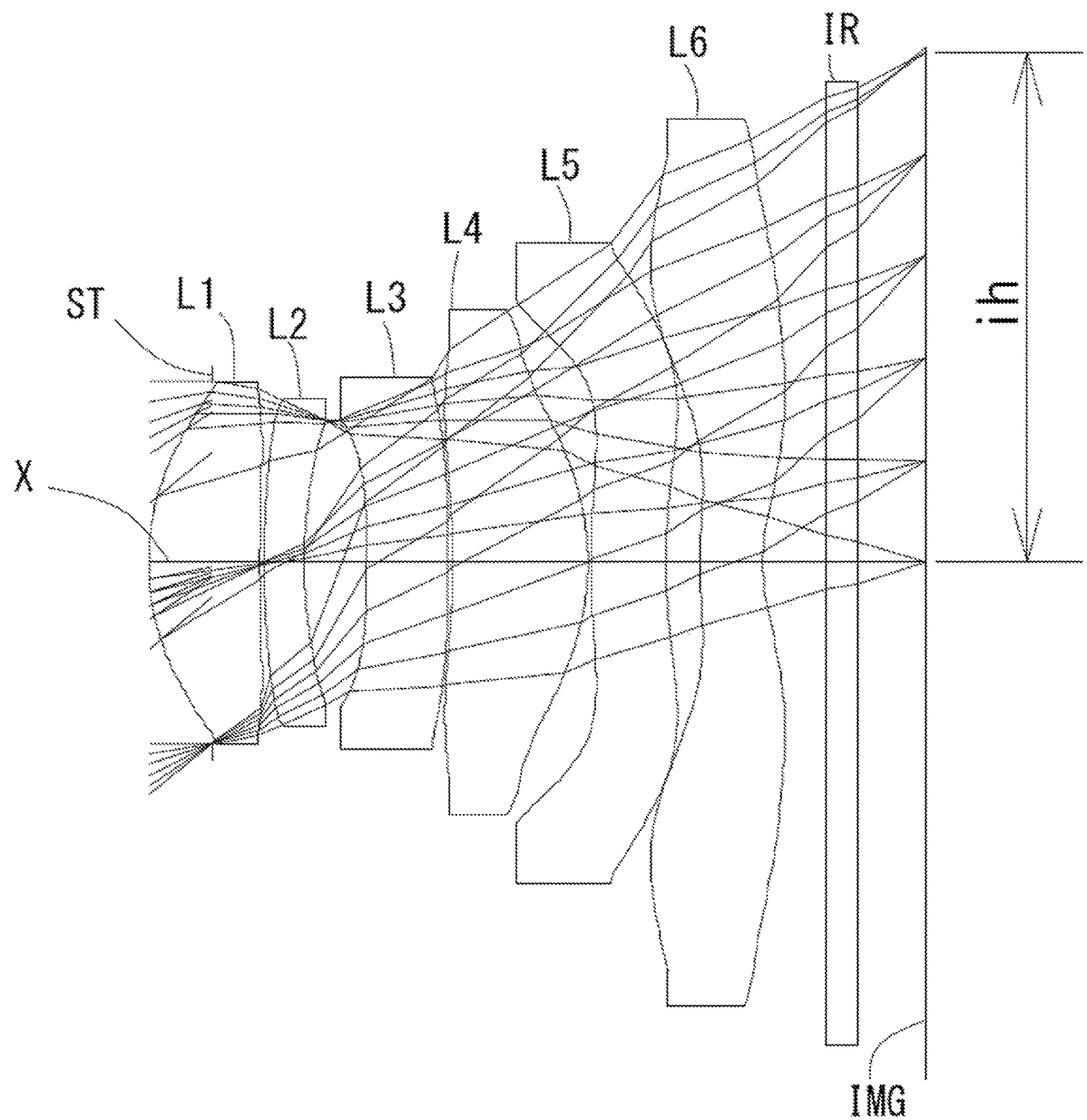
FIG. 1 is a schematic view showing a general configuration of an imaging lens in Example 1 according to the present invention.

As shown in FIG. 1, the imaging lens according to the present embodiment comprises in order from an object side to an image side, a first lens L1 having positive refractive power and a convex surface facing the object side near an optical axis X, a second lens L2 having the convex surface facing the object side near the optical axis X, a third lens L3, a fourth lens L4, a fifth lens L5, and a sixth lens L6 having negative refractive power and a concave surface facing an image side near the optical axis X.

A filter IR such as an IR cut filter and a cover glass are arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has the positive refractive power, and the wide field of view and the low-profileness are achieved by strengthening the refractive power. The shape of the first lens L1 is a meniscus shape having the convex surface facing the object side near the optical axis X, and spherical aberration and distortion are properly corrected.

The second lens L2 has the negative refractive power, and properly corrects the spherical aberration and chromatic aberration occurred at the first lens L1. A shape of the second lens L2 is the meniscus shape having the convex surface facing the object side near the optical axis X, and the chromatic aberration, the spherical aberration, astigmatism, coma aberration and field curvature are properly corrected.

The third lens L3 has the negative refractive power, and properly corrects the coma aberration, the astigmatism and the distortion. A shape of the third lens L3 is a biconcave shape having concave surfaces facing the object side and the image side near the optical axis X, and the chromatic aberration can be properly corrected. The refractive power of the third lens L3 may be positive as in Examples 9, 10, 11 and 12 shown in FIGS. 17, 19, 21 and 23. In this case, the low-profileness is more facilitated. A shape of the third lens L3 may be the meniscus shape having the convex surface facing the object side near the optical axis X as in Examples 5, 7, 8, 9 and 12 shown in FIGS. 9, 13, 15, 17 and 23. In this case, such shape is advantageous for properly correcting the astigmatism, the field curvature and the distortion. In addition, a shape of the third lens L3 may be the biconvex shape having the convex surfaces facing the object side and the image side near the optical axis X as in Examples 10 and 11 shown in FIGS. 19 and 21. In this case, the positive refractive powers of both surfaces are advantageous for the low-profileness.

The fourth lens L4 has the positive refractive power, and maintains the low-profileness and properly corrects the astigmatism, the field curvature and the distortion. A shape of the fourth lens L4 is the meniscus shape having the concave surface facing the object side near the optical axis X, therefore, the light ray incident angle to the fourth lens L4 is appropriately controlled and the chromatic aberration, the spherical aberration, the distortion and the astigmatism are properly corrected.

The fifth lens L5 has the negative refractive power, and the astigmatism, the field curvature and the distortion are properly corrected. A shape of the fifth lens L5 is the meniscus shape having the convex surface facing the object side near the optical axis X, therefore the coma aberration, the astigmatism, the field curvature and the distortion are properly corrected. A shape of the fifth lens L5 may be the meniscus shape having the concave surface facing the object side near the optical axis X as in Examples 9 and 10 shown in FIGS. 17 and 19. In this case, the light ray incident angle to the fifth lens L5 is appropriately controlled and the coma aberration and the high-order spherical aberration are properly corrected. Furthermore, the fifth lens L5 may have a shape having plane surfaces facing the object side and the image side near the optical axis X as in Example 11 and 12 shown in FIGS. 21 and 23 and substantially having no refractive power near the optical axis X. In this case, the field curvature and the distortion are properly corrected by the aspheric surfaces on both sides without affecting the focal length of the overall optical system of the imaging lens or refractive power distribution of other lenses.

The sixth lens L6 has the negative refractive power, and the chromatic aberration, the distortion, the astigmatism and the field curvature are properly corrected. A shape of the sixth lens L6 is a meniscus shape having the concave surface facing the image side near the optical axis X, therefore both of the low-profileness and the securing the back focus are realized at the same time. Furthermore, a shape of the sixth lens L6 may have a biconcave shape having concave surfaces facing the object side and the image side near the optical axis X as in Examples 9, 10 and 11 shown in FIGS. 17, 19 and 21. In this case, the negative refractive power of the both surfaces is advantageous for correcting the chromatic aberration.

The object-side surface of the sixth lens L6 has at least one off-axial pole point, and the field curvature and the distortion are properly corrected. The image-side surface of the sixth lens L6 is formed as the aspheric surface changing to the convex surface at an area apart from the optical axis X. Therefore, the back focus is secured by the negative refractive power near the optical axis X, and the light ray incident angle to the peripheral area is appropriately controlled. Thereby, the field curvature is properly corrected and the light ray incident angle to the image sensor is appropriately controlled.

Regarding the imaging lens according to the present embodiments, it is preferable that all lenses of the first lens L1 to the sixth lens L6 are single lenses. Configuration only with the single lenses can frequently use the aspheric surfaces. In the present embodiments, both-side surfaces of all lenses are formed as appropriate aspheric surfaces, and the aberrations are favorably corrected. Furthermore, workload for cementing is not required, and manufacturing in low cost becomes realizable.

The imaging lens according to the present embodiments shows preferable effect by satisfying the below conditional expressions (1) to (18).

$$-3.00<(D2/f2)\times100<-0.05 \quad (1)$$

$$0.25<(T4/f)\times100<1.00 \quad (2)$$

$$0.15<vd5/vd6<0.70 \quad (3)$$

$$-0.36<f1/f2<0.00 \quad (4)$$

$$0.4<(T3/f)\times100<14.0 \quad (5)$$

$$-77.0<f2/f<-1.4 \quad (6)$$

$$1<|f3|/f<20 \quad (7)$$

$$0.1<r1/r2<0.6 \quad (8)$$

$$0.5<r3/r4<3.0 \quad (9)$$

$$0.4<|r21|/f<2.6 \quad (10)$$

$$0.25<r3/f<2.50 \quad (11)$$

$$f3456/f<-1.5 \quad (12)$$

$$0.4<f1/f4<2.1 \quad (13)$$

$$0.4<f4/f<2.0 \quad (14)$$

$$10<T2/T4<38 \quad (15)$$

where
vd5: abbe number at d-ray of the fifth lens L5,
vd6: abbe number at d-ray of the sixth lens L6,
D2: thickness along the optical axis X of the second lens L2,
T2: distance along the optical axis X from the image-side surface of the second lens L2 to the object-side surface of the third lens L3,
T3: distance along the optical axis X from the image-side surface of the third lens L3 to the object-side surface of the fourth lens L4,
T4: distance along the optical axis X from the image-side surface of the fourth lens L4 to the object-side surface of the fifth lens L5,
f: focal length of the overall optical system of the imaging lens,
f1: focal length of the first lens L1,
f2: focal length of the second lens L2,
f3: focal length of the third lens L3,
f4: focal length of the fourth lens L4, f3456: composite focal length of the third lens L3, the fourth lens L4, the fifth lens L5 and the sixth lens L6,
r1: paraxial curvature radius of the object-side surface of the first lens L1,
r2: paraxial curvature radius of the image-side surface of the first lens L1,
r3: paraxial curvature radius of the object-side surface of the second lens L2, and
r4: paraxial curvature radius of the image-side surface of the second lens L2.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (15a).

$-2.50 < (D2/f2) \times 100 < -0.10$ (1a)

$0.38 < (T4/f) \times 100 < 0.94$ (2a)

$0.25 < vd5/vd6 < 0.60$ (3a)

$-0.32 < f1/f2 < -0.01$ (4a)

$0.6 < (T3/f) \times 100 < 12.0$ (5a)

$-64.0 < f2/f < -2.1$ (6a)

$1.8 < |f3|/f < 17.0$ (7a)

$0.17 < r1/r2 < 0.50$ (8a)

$0.8 < r3/r4 < 2.5$ (9a)

$0.6 < |r2|/f < 2.2$ (10a)

$0.4 < r3/f < 2.1$ (11a)

$-80.0 < f3456/f < -2.3$ (12a)

$0.6 < f1/f4 < 1.7$ (13a)

$0.55 < f4/f < 1.65$ (14a)

$11 < T2/T4 < 32$ (15a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height in a direction perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

[Equation 1]

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

TABLE 1

Example 1
Unit mm
f = 3.90
Fno = 1.7
ω(°) = 38.9
ih = 3.24
TTL = 4.86

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4030 | | |
| 2* | 1.5960 | 0.7038 | 1.544 | 55.86 (vd1) |
| 3* | 5.1942 | 0.0250 | | |
| 4* | 3.1571 | 0.2597 | 1.661 | 20.37 (vd2) |
| 5* | 2.9826 | 0.3981 | | |
| 6* | −7.6760 | 0.5112 | 1.661 | 20.37 (vd3) |
| 7* | 46.2555 | 0.0315 | | |
| 8* | −7.7993 | 0.8810 | 1.535 | 55.66 (vd4) |
| 9* | −1.5694 | 0.0237 | | |
| 10* | 9.6181 | 0.4720 | 1.614 | 25.58 (vd5) |
| 11* | 4.6944 | 0.2135 | | |
| 12* | 3.1943 | 0.3984 | 1.535 | 55.66 (vd6) |
| 13* | 1.2385 | 0.4000 | | |

TABLE 1-continued

Example 1
Unit mm
f = 3.90
Fno = 1.7
ω(°) = 38.9
ih = 3.24
TTL = 4.86

| | | | | |
|---|---|---|---|---|
| 14 | Infinity | 0.2100 | 1.517 | 64.20 |
| 15 | Infinity | 0.4203 | | |
| Image Plane | Infinity | Infinity | | |

Constituent Lens Data

| Lens | Start Surface | Focal Length | Composite Focal Length | |
|---|---|---|---|---|
| 1 | 2 | 3.960 | f3456 | −12.126 |
| 2 | 4 | −200.226 | | |
| 3 | 6 | −9.926 | | |
| 4 | 8 | 3.505 | | |
| 5 | 10 | −15.495 | | |
| 6 | 12 | −4.071 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.494665E−02 | −4.581553E−01 | −5.019561E−01 | −4.514179E−02 | 1.438016E−02 | −2.181993E−01 |
| A6 | 8.304486E−02 | 1.445158E+00 | 1.697561E+00 | −1.454529E−01 | −1.123926E+00 | 3.367773E−01 |
| A8 | −1.260111E−01 | −2.893413E+00 | −3.662439E+00 | 1.337110E+00 | 4.313934E+00 | −3.629079E−01 |
| A10 | 3.123637E−02 | 3.638223E+00 | 5.122767E+00 | −3.932004E+00 | −9.720037E+00 | 3.370235E−01 |
| A12 | 1.064206E−01 | −2.834445E+00 | −4.401046E+00 | 6.044746E+00 | 1.239320E+01 | −2.540359E−01 |
| A14 | −1.147413E−01 | 1.233305E+00 | 2.101800E+00 | −4.811157E+00 | −8.403366E+00 | 1.241646E−01 |
| A16 | 3.165236E−02 | −2.270743E−01 | −4.114485E−01 | 1.587729E+00 | 2.358892E+00 | −2.347958E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.947315E+00 | −1.000000E+00 | −1.000000E+00 | 0.000000E+00 | −6.732601E+00 |
| A4 | −1.431157E−01 | −3.578346E−02 | 1.382275E−01 | 8.114440E−02 | −4.097057E−01 | −1.902676E−01 |
| A6 | 3.142446E−01 | −1.018883E−01 | −3.827975E−01 | −2.250621E−01 | 2.351973E−01 | 9.680195E−02 |
| A8 | −1.223166E−01 | 1.515170E−01 | 3.341578E−01 | 1.635119E−01 | −7.005059E−02 | −2.479085E−02 |
| A10 | −1.657864E−01 | −8.690041E−02 | −1.777582E−01 | −7.143163E−02 | 1.224156E−02 | 3.224974E−03 |
| A12 | 2.041325E−01 | 3.666581E−02 | 5.154788E−02 | 1.949028E−02 | −1.256181E−03 | −1.719901E−04 |
| A14 | −8.438109E−02 | −1.007485E−02 | −6.656163E−03 | −2.982469E−03 | 6.939057E−05 | −1.412879E−06 |
| A16 | 1.214161E−02 | 1.154912E−03 | 2.328801E−04 | 1.931160E−04 | −1.578511E−06 | 3.229464E−07 |

The imaging lens in Example 1 satisfies conditional expressions (1) to (15) as shown in Table 13.

Figure 2:
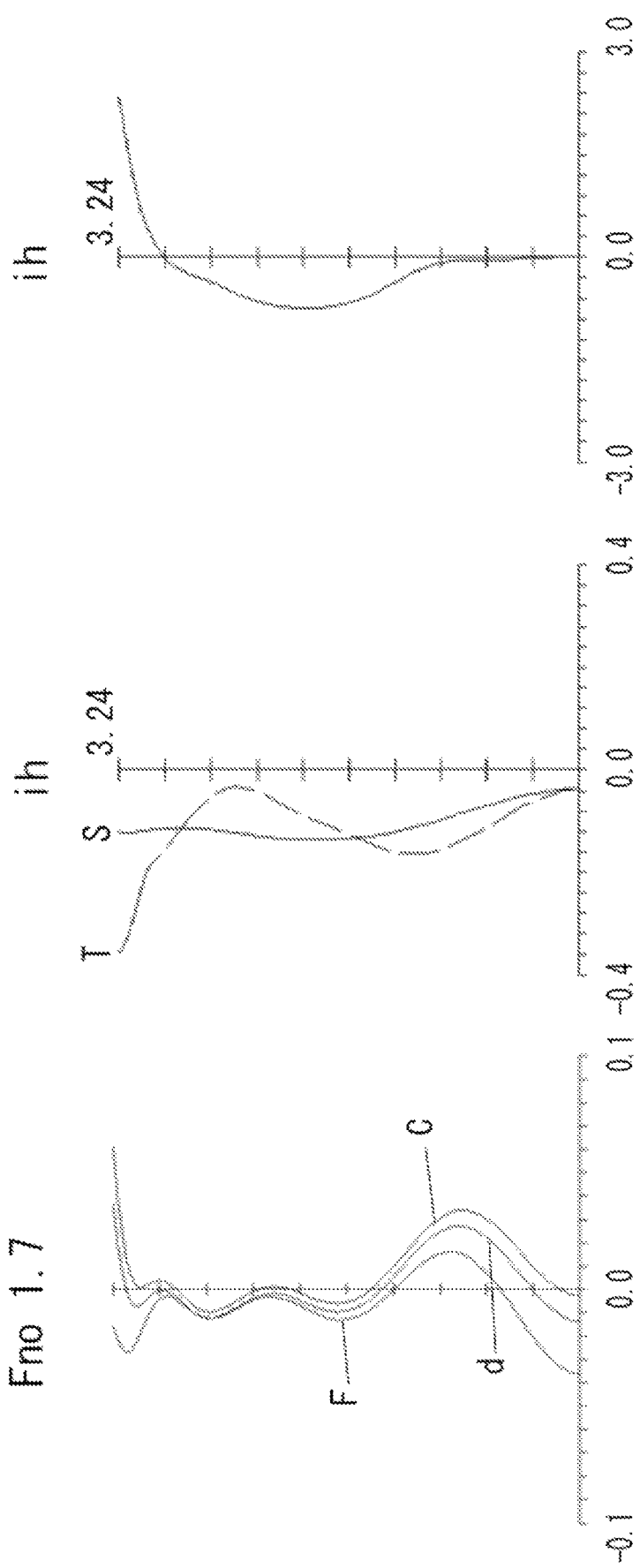
FIG. 2 shows spherical aberration, astigmatism, and distortion of the imaging lens in Example 1 according to the present invention.
Figure 3:
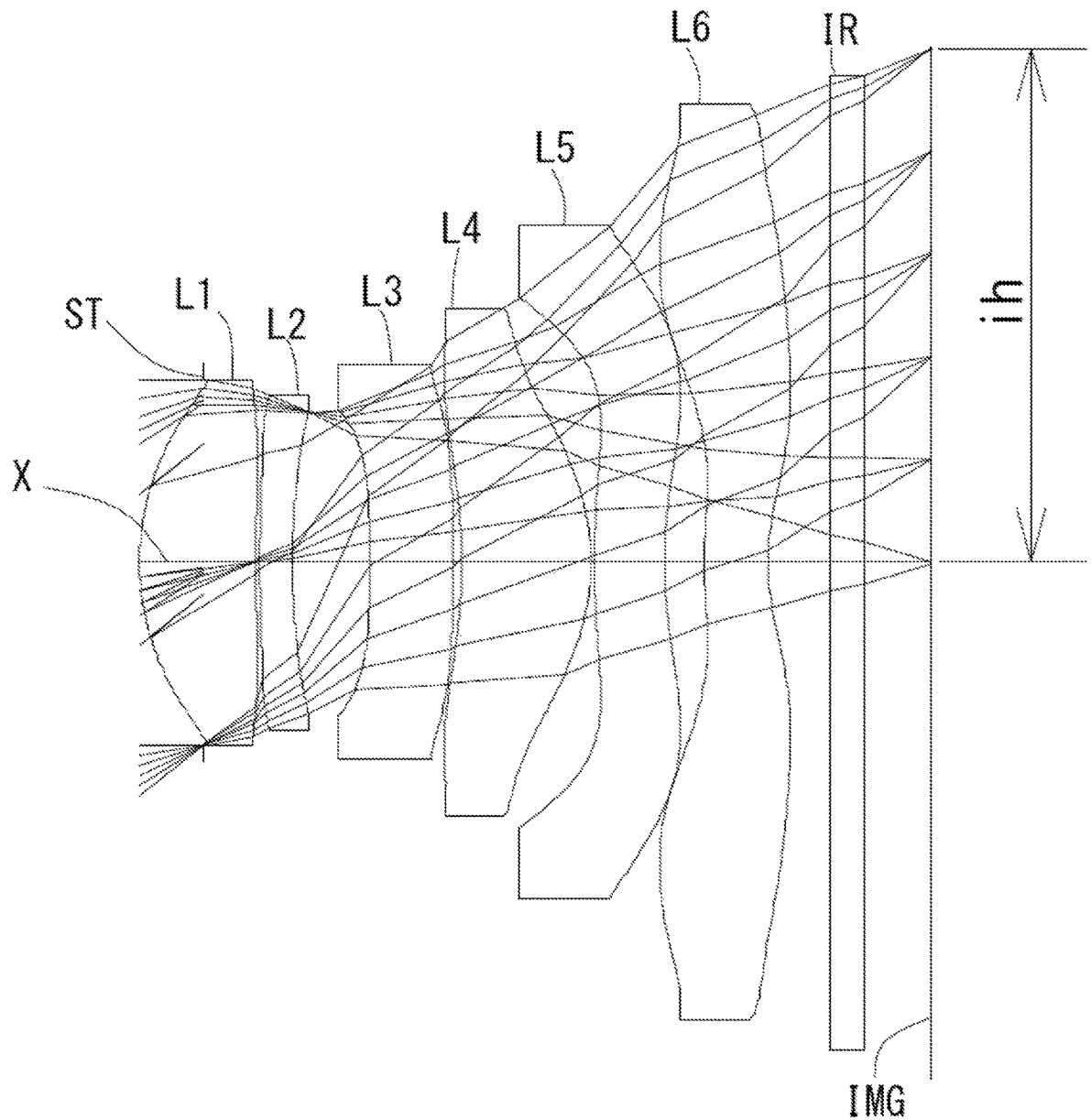
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12, 14, 16, 18, 20, 22 and 24).

EXAMPLE 2

The basic lens data is shown below in Table 2.

TABLE 2

Example 2
Unit mm
f = 3.90
Fno = 1.7
ω(°) = 39.0
ih = 3.24
TTL = 4.91

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.4019 | | |
| 2* | 1.6350 | 0.7292 | 1.544 | 55.86 (vd1) |
| 3* | 5.7021 | 0.0251 | | |
| 4* | 5.2817 | 0.2100 | 1.661 | 20.37 (vd2) |

TABLE 2-continued

Example 2
Unit mm
f = 3.90
Fno = 1.7
ω(°) = 39.0
ih = 3.24
TTL = 4.91

| | | | | |
|---|---|---|---|---|
| 5* | 4.7295 | 0.4860 | | |
| 6* | −10.7171 | 0.5200 | 1.661 | 20.37 (vd3) |
| 7* | 53.3091 | 0.0530 | | |
| 8* | −5.0641 | 0.8208 | 1.535 | 55.66 (vd4) |
| 9* | −1.3275 | 0.0200 | | |
| 10* | 9.3047 | 0.4402 | 1.614 | 25.58 (vd5) |
| 11* | 3.1645 | 0.2478 | | |
| 12* | 2.9756 | 0.3982 | 1.535 | 55.66 (vd6) |
| 13* | 1.2591 | 0.4000 | | |
| 14 | Infinity | 0.2100 | 1.517 | 64.20 |
| 15 | Infinity | 0.4224 | | |
| Image Plane | Infinity | | | |

Constituent Lens Data

| Lens | Start Surface | Focal Length | Composite Focal Length | |
|---|---|---|---|---|
| 1 | 2 | 3.961 | f3456 | −16.204 |
| 2 | 4 | −80.668 | | |
| 3 | 6 | −13.461 | | |
| 4 | 8 | 3.125 | | |
| 5 | 10 | −8.026 | | |
| 6 | 12 | −4.440 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 2.219251E−02 | −2.976772E−01 | −3.056814E−01 | −3.452550E−02 | −1.649320E−01 | −2.494229E−01 |
| A6 | −1.212770E−01 | 5.444987E−01 | 6.379732E−01 | −6.735155E−03 | 3.645910E−01 | 5.057084E−01 |
| A8 | 3.701759E−01 | −6.287588E−01 | −8.156447E−01 | 3.745740E−01 | −1.771822E+00 | −6.910521E−01 |
| A10 | −6.521270E−01 | 4.518719E−01 | 8.136551E−01 | −8.620695E−01 | 4.361607E+00 | 4.768979E−01 |
| A12 | 6.415483E−01 | −2.364737E−01 | −6.468779E−01 | 9.230198E−01 | −6.191618E+00 | −1.309076E−01 |
| A14 | −3.353906E−01 | 8.961423E−02 | 3.539939E−01 | −4.606896E−01 | 4.638928E+00 | −1.238421E−02 |
| A16 | 6.916489E−02 | −1.674795E−02 | −8.341943E−02 | 7.676398E−02 | −1.432825E+00 | 1.095139E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.564791E+00 | −1.000000E+00 | −1.000000E+00 | 0.000000E+00 | −6.518657E+00 |
| A4 | −2.560977E−01 | −2.327232E−02 | 1.542401E−01 | 1.201724E−02 | −4.057406E−01 | −1.934956E−01 |
| A6 | 8.167351E−01 | −1.168705E−01 | −3.737136E−01 | −1.418516E−01 | 2.332138E−01 | 1.063440E−01 |
| A8 | −1.216382E+00 | 1.748212E−01 | 3.201396E−01 | 1.044357E−01 | −7.129138E−02 | −3.201358E−02 |
| A10 | 1.061007E+00 | −1.188553E−01 | −1.690332E−01 | −4.287407E−02 | 1.310337E−02 | 5.728403E−03 |
| A12 | −5.317915E−01 | 5.464838E−02 | 5.144540E−02 | 1.059235E−02 | −1.464649E−03 | −6.109739E−04 |
| A14 | 1.411584E−01 | −1.503413E−02 | −8.221265E−03 | −1.446448E−03 | 9.236738E−05 | 3.639795E−05 |
| A16 | −1.541334E−02 | 1.694523E−03 | 5.506661E−04 | 8.330305E−05 | −2.548786E−06 | −9.473625E−07 |

The imaging lens in Example 2 satisfies conditional expressions (1) to (15) as shown in Table 13.

Figure 4:
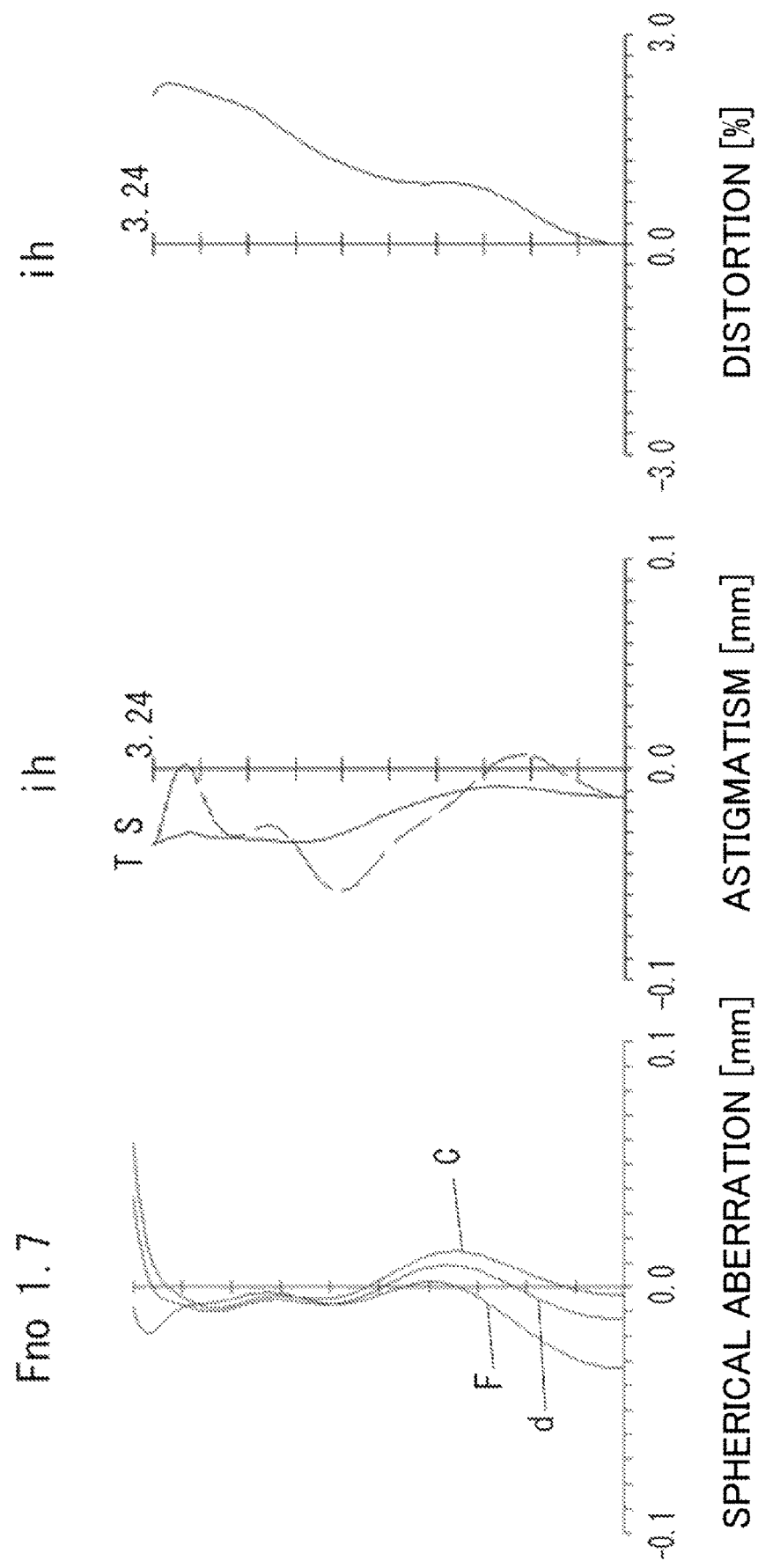
FIG. 4 shows spherical aberration, astigmatism, and distortion of the imaging lens in Example 2 according to the present invention.
Figure 5:
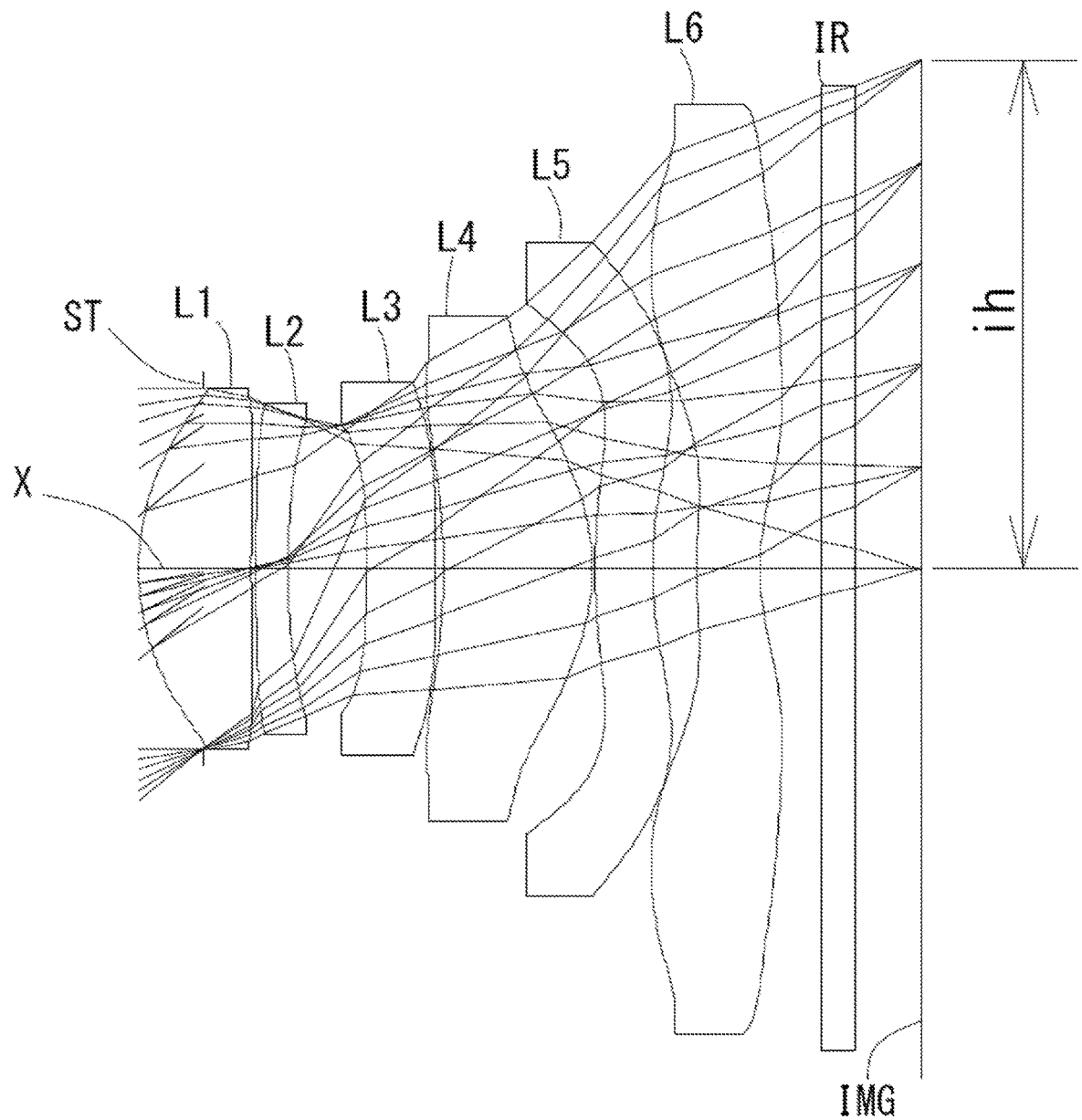
FIG. 5 is a schematic view showing the general configuration of an imaging lens in Example 3 according to the present invention.

FIG. 4 shows the spherical aberration (mm), the astigmatism (mm), and the distortion (%) of the imaging lens in Example 2.

EXAMPLE 3

The basic lens data is shown below in Table 3.

TABLE 3

Example 3
Unit mm
f = 3.91
Fno = 1.7
ω(°) = 39.0
ih = 3.24
TTL = 4.91

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4148 | | |
| 2* | 1.6175 | 0.7137 | 1.544 | 55.86 (vd1) |
| 3* | 5.7426 | 0.0252 | | |
| 4* | 5.1349 | 0.2100 | 1.661 | 20.37 (vd2) |
| 5* | 4.2356 | 0.5015 | | |
| 6* | −14.9483 | 0.4384 | 1.661 | 20.37 (vd3) |
| 7* | 72.0036 | 0.0504 | | |
| 8* | −4.7552 | 0.9477 | 1.535 | 55.66 (vd4) |
| 9* | −1.4215 | 0.0200 | | |
| 10* | 4.7700 | 0.3658 | 1.614 | 25.58 (vd5) |
| 11* | 2.6400 | 0.2782 | | |
| 12* | 3.0573 | 0.3993 | 1.535 | 55.66 (vd6) |
| 13* | 1.2552 | 0.4000 | | |
| 14 | Infinity | 0.2100 | 1.517 | 64.20 |
| 15 | Infinity | 0.4232 | | |
| Image Plane | Infinity | | | |

Constituent Lens Data

| Lens | Start Surface | Focal Length | Composite Focal Length | |
|---|---|---|---|---|
| 1 | 2 | 3.899 | f3456 | −19.583 |
| 2 | 4 | −40.351 | | |
| 3 | 6 | −18.697 | | |
| 4 | 8 | 3.450 | | |
| 5 | 10 | −10.298 | | |
| 6 | 12 | −4.315 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.675830E−02 | −3.075204E−01 | −3.110407E−01 | −4.184615E−02 | −1.744960E−01 | −1.955987E−01 |
| A6 | −9.131112E−02 | 6.868693E−01 | 7.592557E−01 | 1.000237E−01 | 4.125112E−01 | 3.715015E−01 |
| A8 | 2.972311E−01 | −1.091956E+00 | −1.266736E+00 | −7.685139E−02 | −2.028268E+00 | −5.593222E−01 |
| A10 | −5.459363E−01 | 1.232890E+00 | 1.639565E+00 | 1.504258E−01 | 5.004237E+00 | 4.026639E−01 |
| A12 | 5.519330E−01 | −9.653794E−01 | −1.480384E+00 | −3.446050E−01 | −7.110474E+00 | −1.033344E−01 |
| A14 | −2.927886E−01 | 4.459986E−01 | 7.938588E−01 | 3.763308E−01 | 5.324747E+00 | −2.033619E−02 |
| A16 | 6.020633E−02 | −8.829163E−02 | −1.784782E−01 | −1.507638E−01 | −1.640728E+00 | 1.290651E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −5.119861E+00 | −1.000000E+00 | −1.000000E+00 | 0.000000E+00 | −6.492679E+00 |
| A4 | −1.637552E−01 | −7.038125E−02 | 9.546600E−02 | 5.588236E−03 | −4.164567E−01 | −1.977020E−01 |
| A6 | 5.865762E−01 | −4.426055E−02 | −3.013795E−01 | −1.675713E−01 | 2.422150E−01 | 1.105875E−01 |
| A8 | −9.429588E−01 | 9.965855E−02 | 2.517653E−01 | 1.360497E−01 | −7.382361E−02 | −3.312239E−02 |
| A10 | 8.842064E−01 | −6.154976E−02 | −1.185440E−01 | −6.134956E−02 | 1.338864E−02 | 5.821833E−03 |
| A12 | −4.704424E−01 | 2.456451E−02 | 2.731154E−02 | 1.631496E−02 | −1.462763E−03 | −6.040631E−04 |
| A14 | 1.310370E−01 | −6.155751E−03 | −1.963429E−03 | −2.343932E−03 | 8.938939E−05 | 3.465772E−05 |
| A16 | −1.497701E−02 | 6.450635E−04 | −1.128505E−04 | 1.393502E−04 | −2.368584E−06 | −8.599661E−07 |

The imaging lens in Example 3 satisfies conditional expressions (1) to (15) as shown in Table 13.

Figure 6:
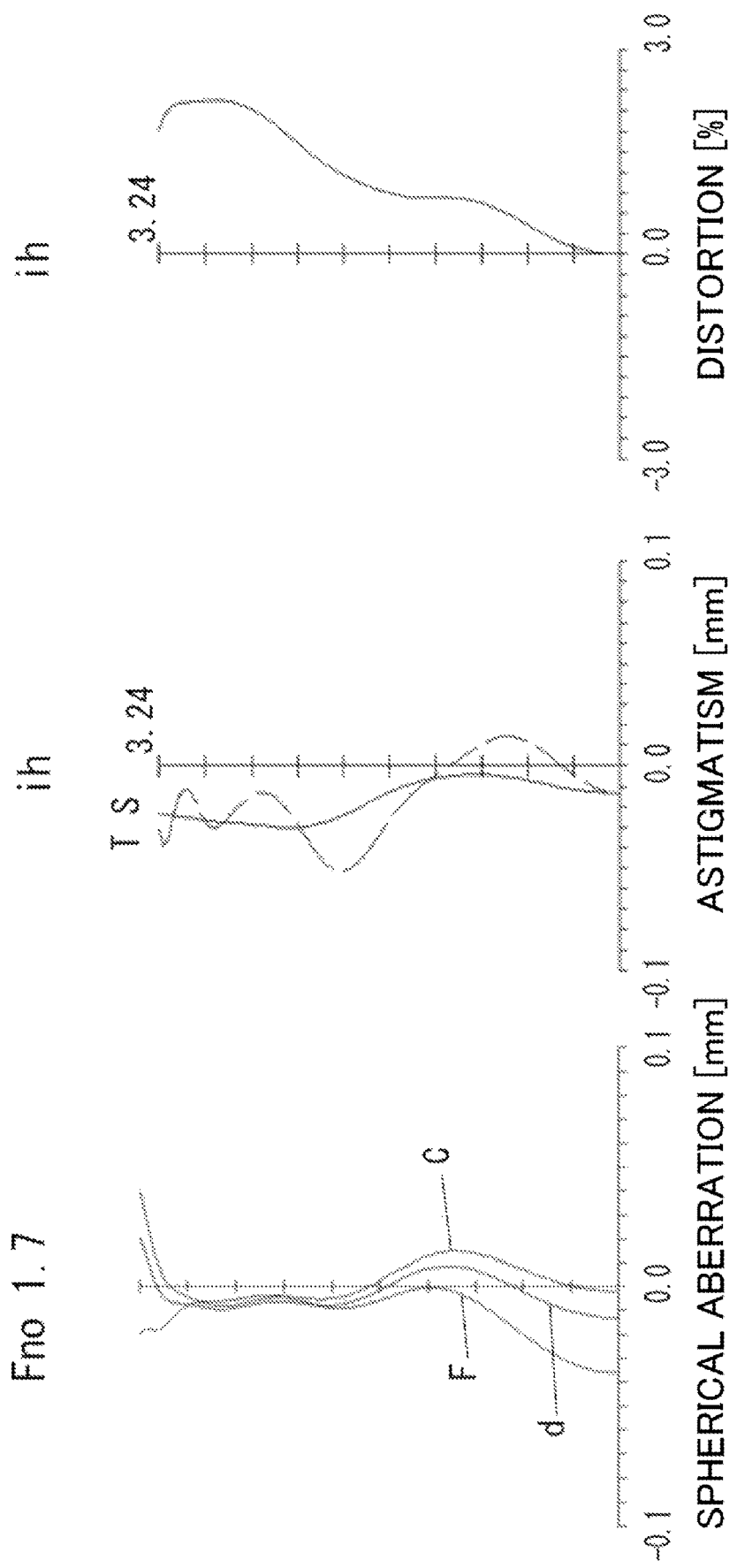
FIG. 6 shows spherical aberration, astigmatism, and distortion of the imaging lens in Example 3 according to the present invention.
Figure 7:
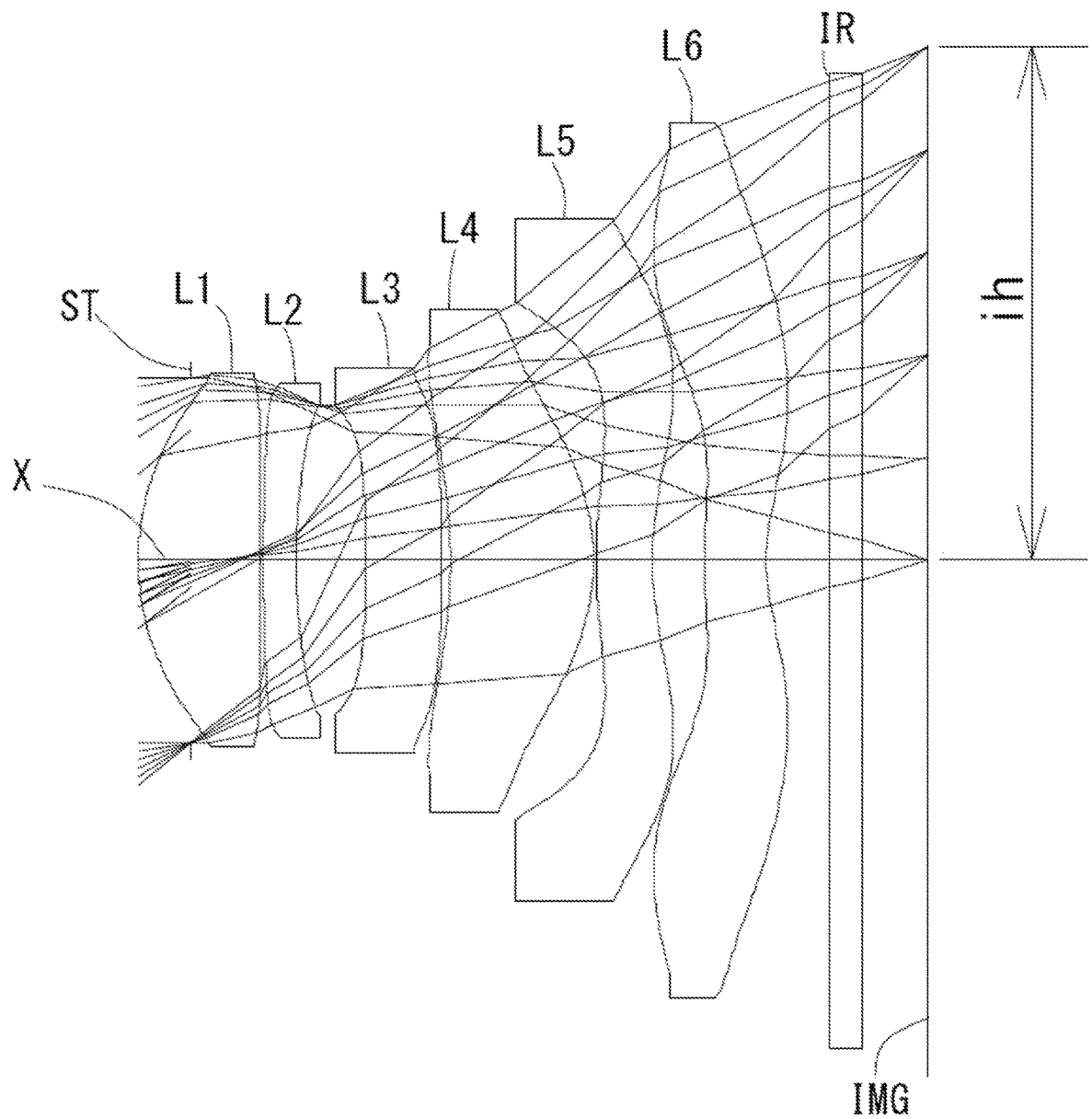
FIG. 7 is a schematic view showing the general configuration of an imaging lens in Example 4 according to the present invention.

FIG. 6 shows the spherical aberration (mm), the astigmatism (mm), and the distortion (%) of the imaging lens in Example 3.

EXAMPLE 4

The basic lens data is shown below in Table 4.

TABLE 4

Example 4
Unit mm
f = 3.91
Fno = 1.7
ω(°) = 39.0
ih = 3.24
TTL = 4.91

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.3300 | | |
| 2* | 1.6360 | 0.7606 | 1.544 | 55.86 (vd1) |
| 3* | 6.7713 | 0.0250 | | |
| 4* | 5.3935 | 0.2100 | 1.661 | 20.37 (vd2) |
| 5* | 3.7807 | 0.4354 | | |
| 6* | −42.5885 | 0.4772 | 1.661 | 20.37 (vd3) |
| 7* | 129.0590 | 0.0587 | | |
| 8* | −4.0201 | 0.9046 | 1.535 | 55.66 (vd4) |
| 9* | −1.3487 | 0.0200 | | |
| 10* | 4.5977 | 0.3500 | 1.614 | 25.58 (vd5) |
| 11* | 2.2123 | 0.3249 | | |
| 12* | 2.8962 | 0.3900 | 1.535 | 55.66 (vd6) |
| 13* | 1.2921 | 0.4000 | | |
| 14 | Infinity | 0.2100 | 1.517 | 64.20 |
| 15 | Infinity | 0.4163 | | |
| Image Plane | Infinity | | | |

Constituent Lens Data

| Lens | Start Surface | Focal Length | Composite Focal Length | |
|---|---|---|---|---|
| 1 | 2 | 3.767 | f3456 | −28.722 |
| 2 | 4 | −20.181 | | |
| 3 | 6 | −48.409 | | |
| 4 | 8 | 3.395 | | |
| 5 | 10 | −7.353 | | |
| 6 | 12 | −4.766 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.314854E−02 | −3.613569E−01 | −3.794969E−01 | −6.410773E−02 | −1.534905E−01 | −2.125438E−01 |
| A6 | −5.682942E−02 | 9.936721E−01 | 1.061752E+00 | 6.272260E−02 | 1.877188E−01 | 4.551382E−01 |
| A8 | 1.668851E−01 | −1.719659E+00 | −1.787632E+00 | 4.529589E−01 | −8.541968E−01 | −7.959582E−01 |
| A10 | −2.768910E−01 | 1.936687E+00 | 2.023345E+00 | −1.589295E+00 | 1.720304E+00 | 7.045416E−01 |
| A12 | 2.533550E−01 | −1.431532E+00 | −1.497351E+00 | 2.427362E+00 | −2.069428E+00 | −2.884780E−01 |
| A14 | −1.210188E−01 | 6.183792E−01 | 6.517456E−01 | −1.837758E+00 | 1.281047E+00 | 2.111336E−02 |
| A16 | 2.075327E−02 | −1.159321E−01 | −1.166212E−01 | 5.702602E−01 | −3.099234E−01 | 1.435418E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −5.181441E+00 | −1.000000E+00 | −1.000000E+00 | 0.000000E+00 | −6.330310E+00 |
| A4 | −1.864116E−01 | −9.314452E−02 | 4.740399E−02 | −6.428117E−02 | −3.972425E−01 | −1.925412E−01 |
| A6 | 7.268569E−01 | 7.195772E−03 | −2.529879E−01 | −7.909205E−02 | 2.148717E−01 | 1.003552E−01 |
| A8 | −1.330793E+00 | 3.639762E−02 | 2.237765E−01 | 7.115787E−02 | −6.237913E−02 | −3.115335E−02 |
| A10 | 1.427642E+00 | −2.514733E−02 | −1.255168E−01 | −3.013285E−02 | 1.103730E−02 | 5.978580E−03 |
| A12 | −8.730578E−01 | 1.758129E−02 | 4.510762E−02 | 7.182004E−03 | −1.210867E−03 | −7.004774E−04 |
| A14 | 2.810034E−01 | −7.665171E−03 | −1.041374E−02 | −9.062191E−04 | 7.666617E−05 | 4.682143E−05 |
| A16 | −3.692293E−02 | 1.180040E−03 | 1.181161E−03 | 4.703129E−05 | −2.182116E−06 | −1.390026E−06 |

The imaging lens in Example 4 satisfies conditional expressions (1) to (15) as shown in Table 13.

Figure 8:
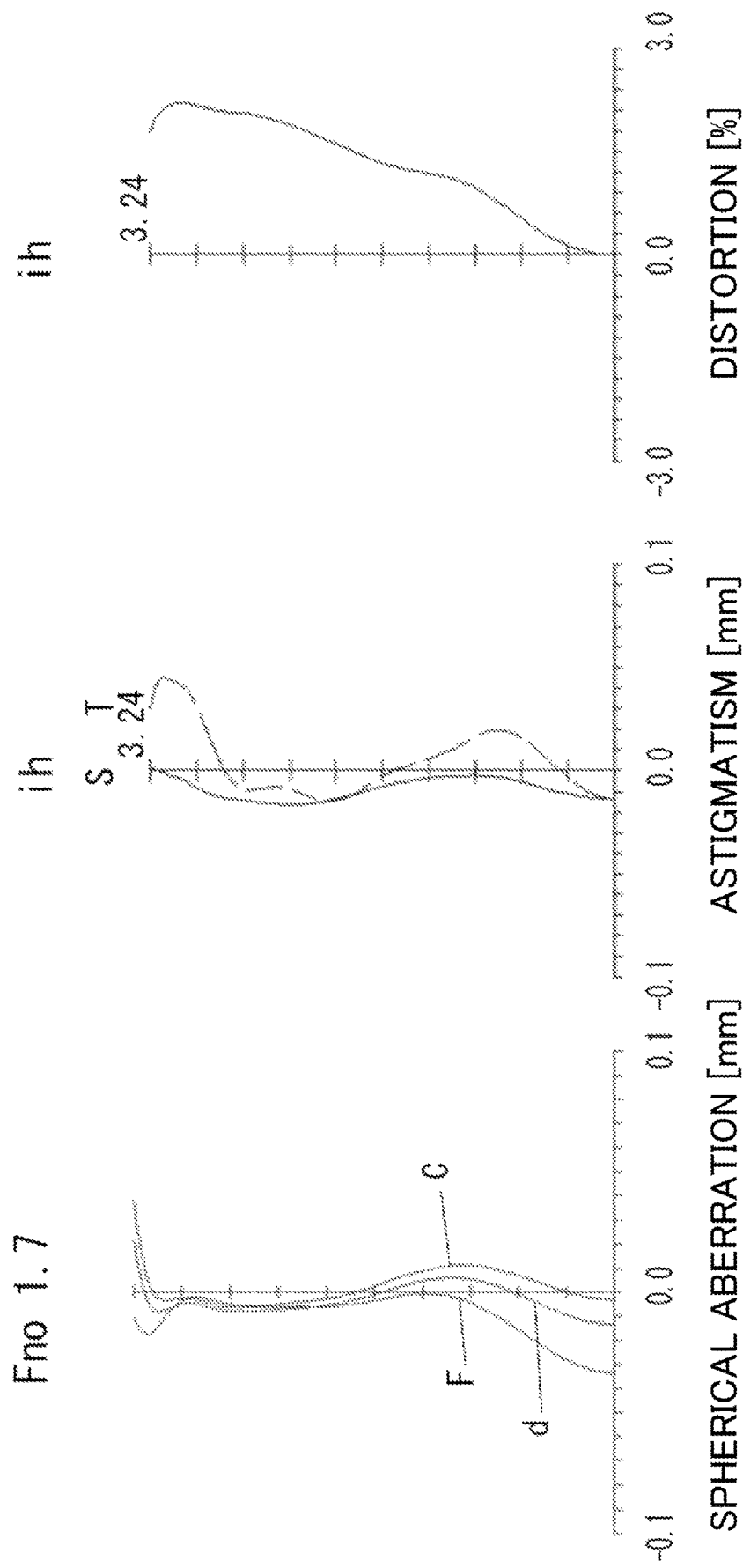
FIG. 8 shows spherical aberration, astigmatism, and distortion of the imaging lens in Example 4 according to the present invention.
Figure 9:
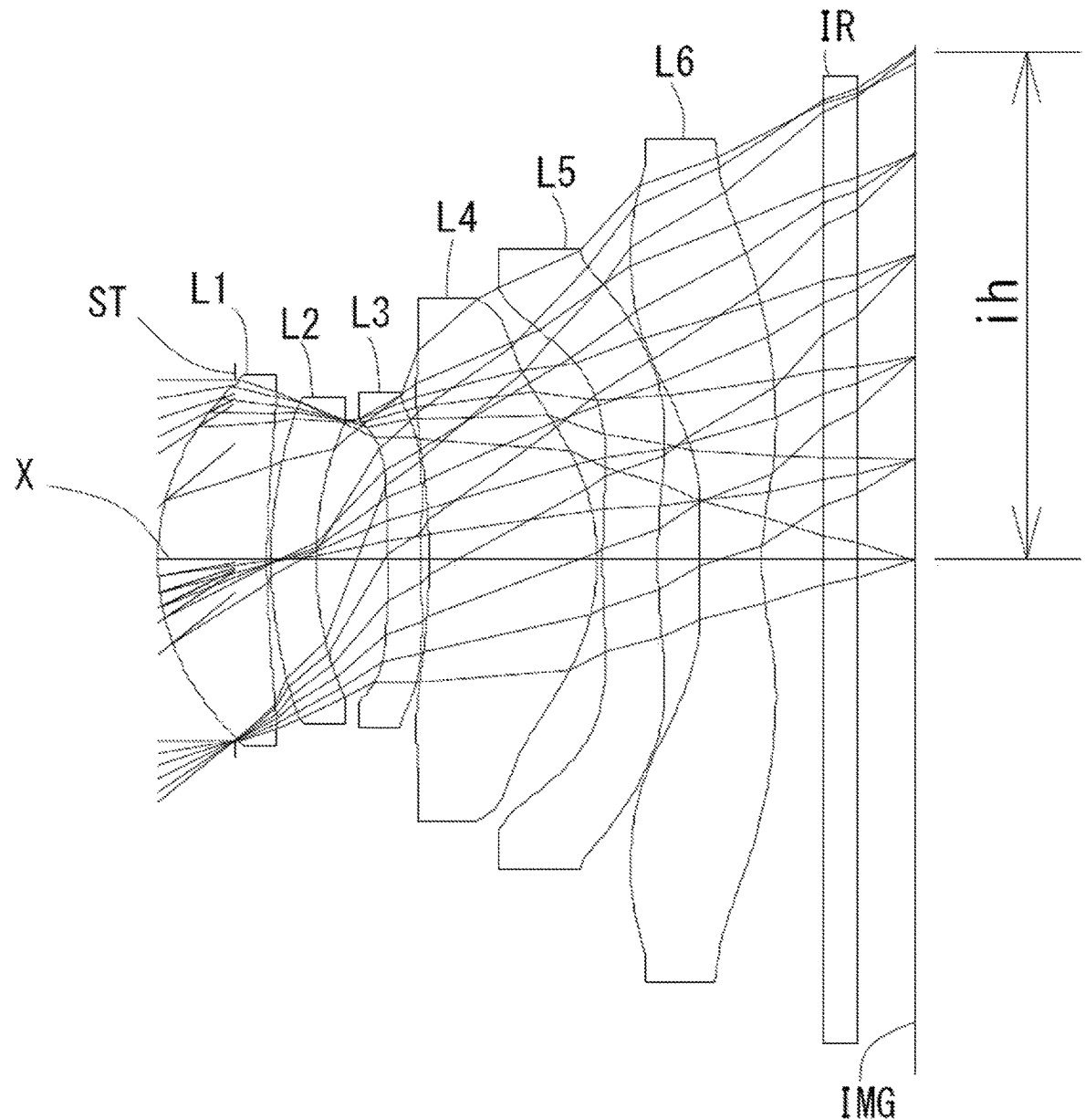
FIG. 9 is a schematic view showing a general configuration of an imaging lens in Example 5 according to the present invention.

FIG. 8 shows the spherical aberration (mm), the astigmatism (mm), and the distortion (%) of the imaging lens in Example 4.

EXAMPLE 5

The basic lens data is shown below in Table 5.

TABLE 5

Example 5
Unit mm
f = 3.93
Fno = 1.7
ω(°) = 38.9
ih = 3.24
TTL = 4.75

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4898 | | |
| 2* | 1.5081 | 0.6956 | 1.497 | 81.56 (vd1) |
| 3* | 4.4484 | 0.0250 | | |
| 4* | 2.3172 | 0.2862 | 1.661 | 20.37 (vd2) |
| 5* | 2.1650 | 0.4495 | | |
| 6* | 27.6538 | 0.2200 | 1.661 | 20.37 (vd3) |
| 7* | 11.2028 | 0.0488 | | |
| 8* | −4.7203 | 1.0714 | 1.535 | 55.66 (vd4) |
| 9* | −1.4352 | 0.0341 | | |
| 10* | 7.6514 | 0.3502 | 1.614 | 25.58 (vd5) |
| 11* | 4.1444 | 0.2653 | | |
| 12* | 7.2357 | 0.3938 | 1.535 | 55.66 (vd6) |
| 13* | 1.4161 | 0.4000 | | |
| 14 | Infinity | 0.2100 | 1.517 | 64.20 |
| 15 | Infinity | 0.3720 | | |
| Image Plane | Infinity | | | |

Constituent Lens Data

| Lens | Start Surface | Focal Length | Composite Focal Length | |
|---|---|---|---|---|
| 1 | 2 | 4.256 | f3456 | −14.925 |
| 2 | 4 | −198.497 | | |
| 3 | 6 | −28.653 | | |
| 4 | 8 | 3.463 | | |
| 5 | 10 | −15.302 | | |
| 6 | 12 | −3.372 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.320831E−02 | −2.553746E−01 | −2.541814E−01 | −2.873361E−02 | −7.606895E−02 | −1.463918E−01 |
| A6 | 2.013111E−01 | 7.794711E−01 | 8.289962E−01 | 1.195416E−01 | −8.194382E−01 | 1.057962E−01 |
| A8 | −4.827703E−01 | −1.620662E+00 | −1.941274E+00 | −2.887159E−01 | 2.891252E+00 | −6.565240E−01 |
| A10 | 6.662979E−01 | 2.199911E+00 | 2.963705E+00 | 3.675267E−01 | −6.755415E+00 | 1.409561E+00 |
| A12 | −5.281275E−01 | −1.859366E+00 | −2.752774E+00 | −5.155795E−02 | 8.881318E+00 | −1.639228E+00 |
| A14 | 2.242762E−01 | 8.731784E−01 | 1.394164E+00 | −3.546526E−01 | −6.594661E+00 | 9.663928E−01 |
| A16 | −4.082081E−02 | −1.718792E−01 | −2.808483E−01 | 2.582897E−01 | 2.194995E+00 | −2.033226E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −6.665829E+00 | −1.000000E+00 | −1.000000E+00 | 0.000000E+00 | −9.684518E+00 |
| A4 | 1.984946E−02 | −2.395451E−01 | 2.098548E−02 | −3.919250E−03 | −4.968877E−01 | −2.352121E−01 |
| A6 | −9.550050E−02 | 2.123476E−01 | −2.836738E−01 | −2.193413E−01 | 3.614903E−01 | 1.551896E−01 |
| A8 | 2.228116E−01 | −2.065946E−01 | 2.858493E−01 | 2.122612E−01 | −1.306396E−01 | −5.621320E−02 |
| A10 | −1.723669E−01 | 1.829152E−01 | −1.616862E−01 | −1.100322E−01 | 2.749315E−02 | 1.172827E−02 |
| A12 | 6.275359E−02 | −8.603633E−02 | 4.699812E−02 | 3.383471E−02 | −3.414733E−03 | −1.410254E−03 |
| A14 | −1.016701E−02 | 1.958032E−02 | −5.725752E−03 | −5.737454E−03 | 2.329653E−04 | 9.187881E−05 |
| A16 | 1.307597E−04 | −1.812259E−03 | 1.528488E−04 | 4.102837E−04 | −6.761688E−06 | −2.540851E−06 |

The imaging lens in Example 5 satisfies conditional expressions (1) to (15) as shown in Table 13.

Figure 10:
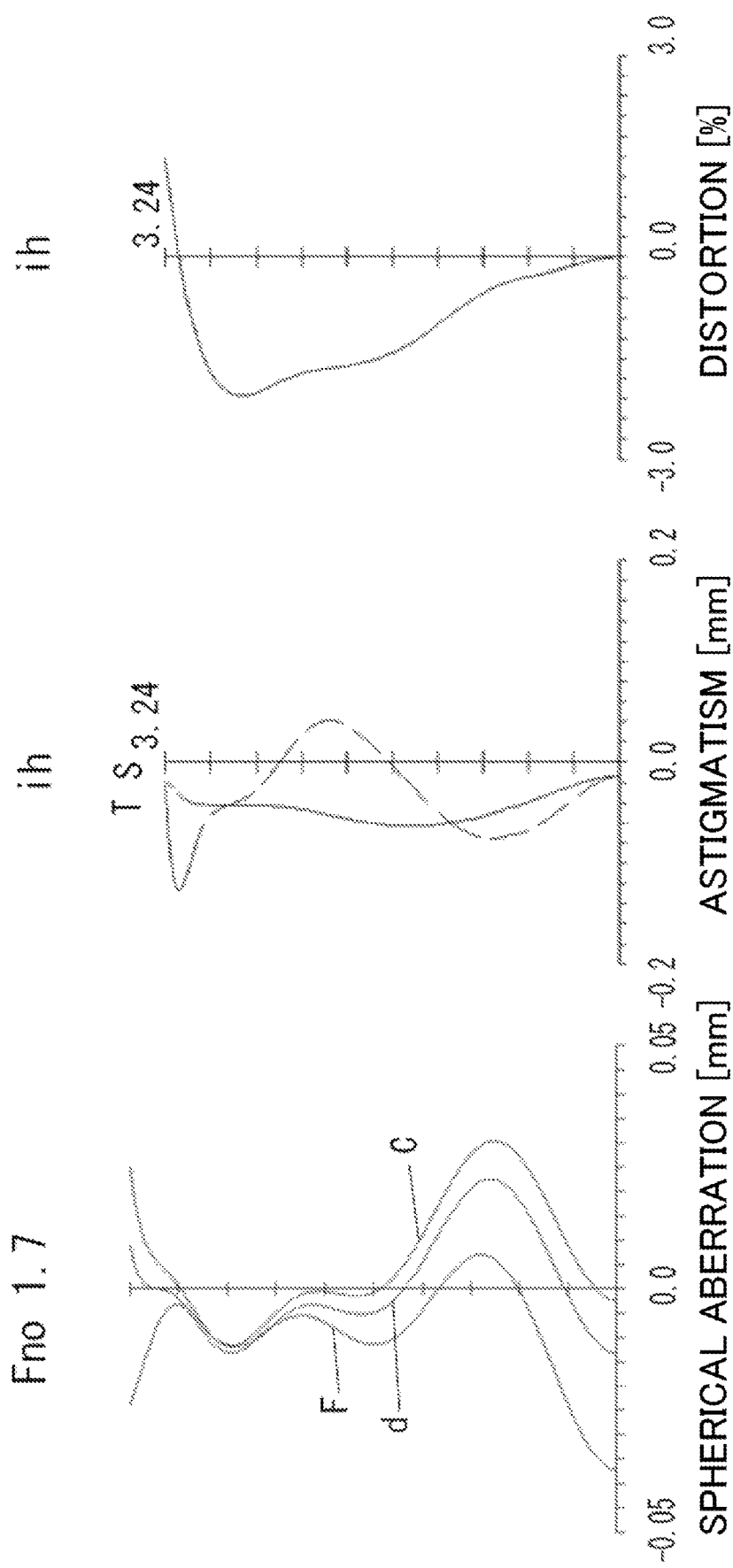
FIG. 10 shows spherical aberration, astigmatism, and distortion of the imaging lens in Example 5 according to the present invention.
Figure 11:
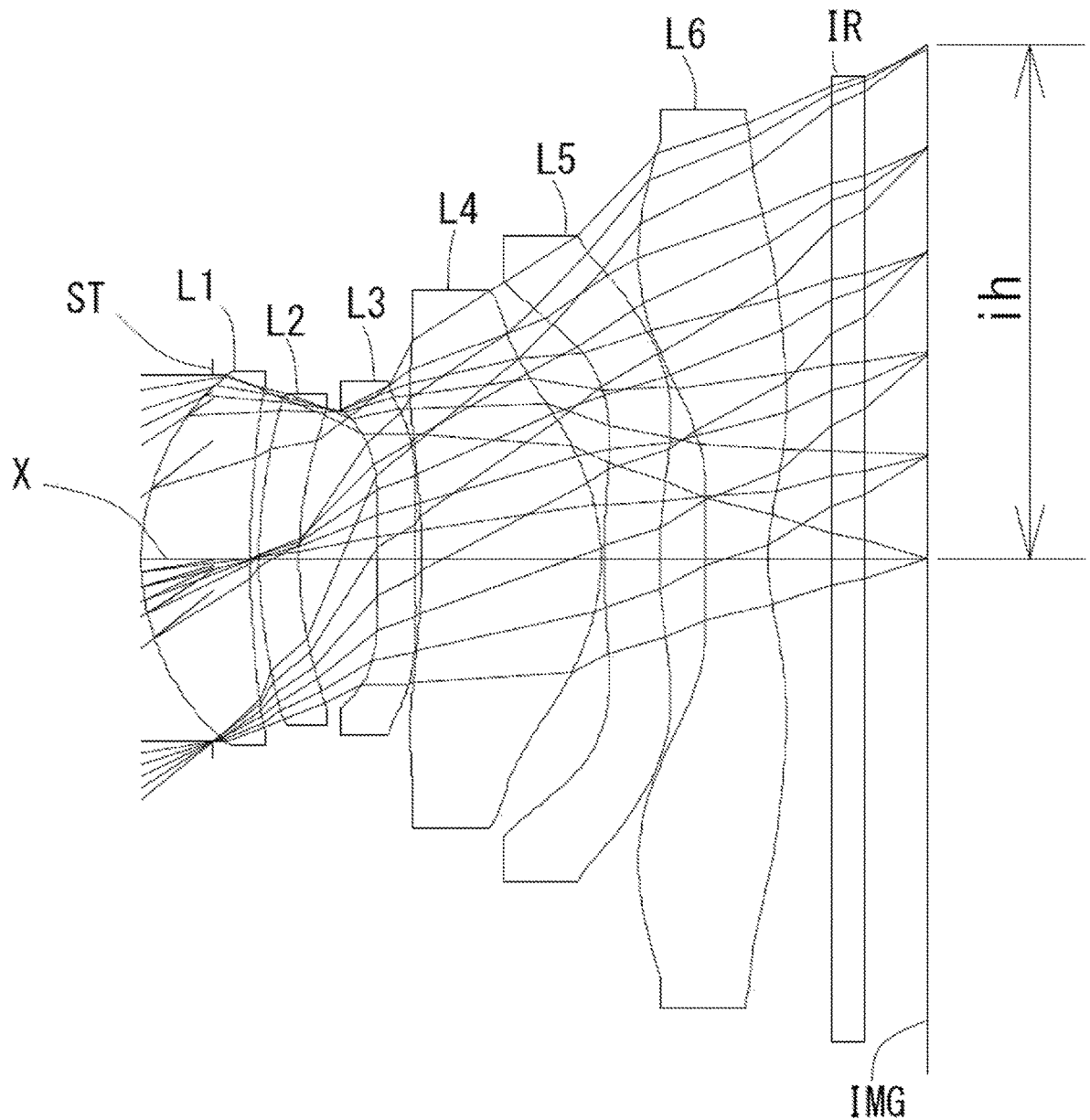
FIG. 11 is a schematic view showing the general configuration of an imaging lens in Example 6 according to the present invention.

FIG. 10 shows the spherical aberration (mm), the astigmatism (mm), and the distortion (%) of the imaging lens in Example 5.

EXAMPLE 6

The basic lens data is shown below in Table 6.

TABLE 6

Example 6
Unit mm
f = 3.93
Fno = 1.7
ω(°) = 39.0
ih = 3.24
TTL = 4.88

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4479 | | |
| 2* | 1.5581 | 0.6843 | 1.497 | 81.56 (vd1) |
| 3* | 4.9704 | 0.0540 | | |
| 4* | 2.6119 | 0.2568 | 1.661 | 20.37 (vd2) |
| 5* | 2.3920 | 0.4992 | | |
| 6* | −64.7029 | 0.2321 | 1.661 | 20.37 (vd3) |
| 7* | 18.3177 | 0.0376 | | |
| 8* | −5.5061 | 1.1327 | 1.535 | 55.66 (vd4) |
| 9* | −1.3844 | 0.0200 | | |
| 10* | 5.5299 | 0.3500 | 1.614 | 25.58 (vd5) |
| 11* | 3.2266 | 0.2881 | | |
| 12* | 5.6973 | 0.3930 | 1.535 | 55.66 (vd6) |
| 13* | 1.3515 | 0.4000 | | |
| 14 | Infinity | 0.2100 | 1.517 | 64.20 |
| 15 | Infinity | 0.3924 | | |
| Image Plane | Infinity | | | |

Constituent Lens Data

| Lens | Start Surface | Focal Length | Composite Focal Length | |
|---|---|---|---|---|
| 1 | 2 | 4.281 | f3456 | −23.251 |
| 2 | 4 | −80.355 | | |
| 3 | 6 | −21.582 | | |
| 4 | 8 | 3.156 | | |
| 5 | 10 | −13.386 | | |
| 6 | 12 | −3.421 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −9.576577E−04 | −8.612158E−02 | −1.128938E−01 | −1.265846E−02 | −1.656441E−01 | −1.525781E−01 |
| A6 | 7.597136E−03 | 1.067812E−01 | 1.748749E−01 | −9.918292E−02 | −1.365393E−01 | 8.718087E−02 |
| A8 | 4.878714E−02 | 1.950668E−02 | −2.504269E−01 | 5.143221E−01 | 7.598084E−02 | −3.461927E−01 |
| A10 | −1.577285E−01 | −3.033710E−01 | 2.207419E−01 | −1.369087E+00 | 4.381539E−04 | 5.951410E−01 |
| A12 | 2.124231E−01 | 4.856570E−01 | −5.959169E−02 | 2.015918E+00 | −2.747268E−01 | −6.148588E−01 |
| A14 | −1.331060E−01 | −3.528775E−01 | −7.148393E−02 | −1.602500E+00 | 4.115225E−02 | 3.369072E−01 |
| A16 | 3.225283E−02 | 1.037860E−01 | 5.693187E−02 | 5.329208E−01 | 1.616786E−01 | −6.152292E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −6.862341E+00 | −1.000000E+00 | −1.000000E+00 | 0.000000E+00 | −7.995719E+00 |
| A4 | −1.040185E−02 | −2.179050E−01 | 3.686707E−02 | −6.730511E−03 | −4.414291E−01 | −2.160280E−01 |
| A6 | 7.032637E−02 | 1.542568E−01 | −2.864858E−01 | −1.998678E−01 | 2.859566E−01 | 1.345931E−01 |
| A8 | −1.304021E−01 | −9.560601E−02 | 2.846573E−01 | 1.796475E−01 | −9.283490E−02 | −4.506725E−02 |
| A10 | 1.820369E−01 | 5.808862E−02 | −1.617493E−01 | −8.715998E−02 | 1.772127E−02 | 8.691762E−03 |
| A12 | −1.261264E−01 | −1.663503E−02 | 4.978304E−02 | 2.496474E−02 | −2.015461E−03 | −9.665006E−04 |
| A14 | 4.102473E−02 | 1.151643E−03 | −7.474335E−03 | −3.901785E−03 | 1.268660E−04 | 5.800060E−05 |
| A16 | −5.224471E−03 | 1.226775E−04 | 4.297330E−04 | 2.549957E−04 | −3.416146E−06 | −1.467137E−06 |

The imaging lens in Example 6 satisfies conditional expressions (1) to (15) as shown in Table 13.

Figure 12:
FIG. 12 shows spherical aberration, astigmatism, and distortion of the imaging lens in Example 6 according to the present invention.
Figure 13:
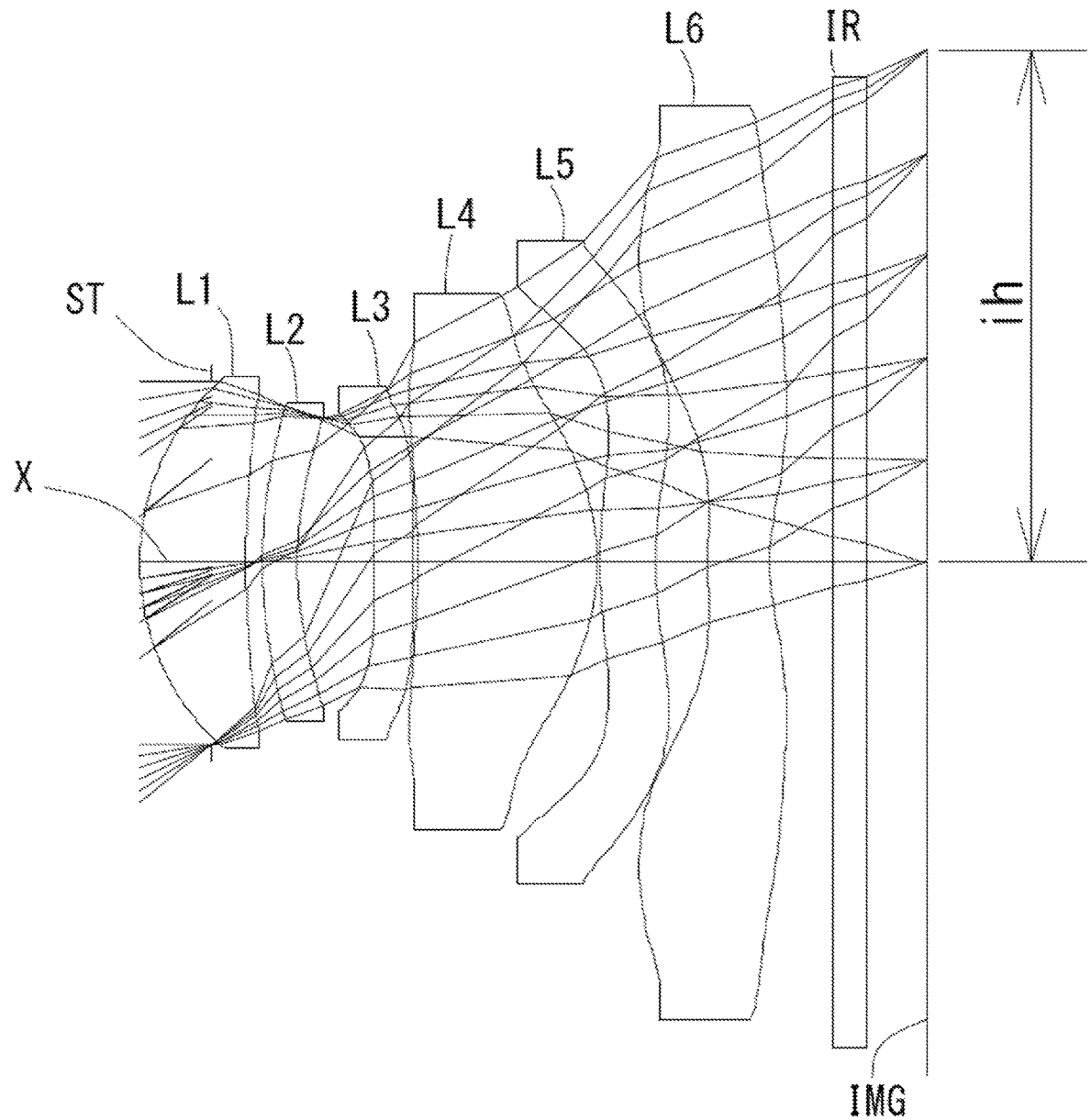
FIG. 13 is a schematic view showing the general configuration of an imaging lens in Example 7 according to the present invention.

FIG. 12 shows the spherical aberration (mm), the astigmatism (mm), and the distortion (%) of the imaging lens in Example 6.

EXAMPLE 7

The basic lens data is shown below in Table 7.

TABLE 7

Example 7
Unit mm
f = 3.93
Fno = 1.7
ω(°) = 39.0
ih = 3.24
TTL = 4.91

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4558 | | |
| 2* | 1.5983 | 0.6686 | 1.497 | 81.56 (vd1) |
| 3* | 5.5495 | 0.1034 | | |
| 4* | 2.5398 | 0.2250 | 1.661 | 20.37 (vd2) |
| 5* | 2.2368 | 0.4863 | | |
| 6* | 2319.3650 | 0.2385 | 1.661 | 20.37 (vd3) |
| 7* | 16.1474 | 0.0340 | | |
| 8* | −6.2979 | 1.1376 | 1.535 | 55.66 (vd4) |
| 9* | −1.5003 | 0.0200 | | |
| 10* | 3.8417 | 0.3500 | 1.614 | 25.58 (vd5) |
| 11* | 2.7569 | 0.3298 | | |
| 12* | 6.5607 | 0.3900 | 1.535 | 55.66 (vd6) |
| 13* | 1.4163 | 0.4000 | | |
| 14 | Infinity | 0.2100 | 1.517 | 64.20 |
| 15 | Infinity | 0.3847 | | |
| Image Plane | Infinity | | | |

Constituent Lens Data

| Lens | Start Surface | Focal Length | Composite Focal Length | |
|---|---|---|---|---|
| 1 | 2 | 4.276 | f3456 | −35.834 |
| 2 | 4 | −40.279 | | |
| 3 | 6 | −24.610 | | |
| 4 | 8 | 3.401 | | |
| 5 | 10 | −18.121 | | |
| 6 | 12 | −3.469 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.414196E−02 | −5.908402E−02 | −1.042727E−01 | −4.727647E−02 | −2.195640E−01 | −1.527542E−01 |
| A6 | −6.279461E−02 | 6.166831E−02 | 1.028652E−01 | −1.204417E−02 | 2.720215E−01 | 1.231177E−01 |
| A8 | 2.124842E−01 | −1.264154E−02 | −1.688104E−01 | 8.306197E−02 | −1.498241E+00 | −4.396790E−01 |
| A10 | −3.761985E−01 | −7.696124E−02 | 2.824368E−01 | −1.496464E−01 | 3.579108E+00 | 7.314785E−01 |
| A12 | 3.758662E−01 | 1.380013E−01 | −2.976880E−01 | 1.322184E−01 | −4.917173E+00 | −7.341920E−01 |
| A14 | −1.973559E−01 | −1.085873E−01 | 1.567226E−01 | −9.071103E−02 | 3.299050E+00 | 3.955091E−01 |
| A16 | 4.256947E−02 | 3.567244E−02 | −2.059205E−02 | 3.467685E−02 | −6.097551E−01 | −7.514232E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −9.919037E+00 | −1.000000E+00 | −1.000000E+00 | 0.000000E+00 | −8.549199E+00 |
| A4 | 6.541012E−03 | −2.637794E−01 | 1.126527E−02 | −3.085958E−02 | −4.470929E−01 | −2.133378E−01 |
| A6 | 8.080227E−02 | 2.531796E−01 | −2.518394E−01 | −1.654612E−01 | 2.962967E−01 | 1.330046E−01 |
| A8 | −1.797721E−01 | −2.102118E−01 | 2.641382E−01 | 1.538849E−01 | −9.810283E−02 | −4.382435E−02 |
| A10 | 2.269472E−01 | 1.469179E−01 | −1.566773E−01 | −7.571827E−02 | 1.912306E−02 | 8.335375E−03 |
| A12 | −1.446858E−01 | −5.870899E−02 | 5.110349E−02 | 2.183111E−02 | −2.224953E−03 | −9.192412E−04 |
| A14 | 4.491997E−02 | 1.167322E−02 | −8.454110E−03 | −3.420349E−03 | 1.434995E−04 | 5.495167E−05 |
| A16 | −5.486636E−03 | −9.258210E−04 | 5.637976E−04 | 2.238461E−04 | −3.963877E−06 | −1.388793E−06 |

The imaging lens in Example 7 satisfies conditional expressions (1) to (15) as shown in Table 13.

Figure 14:
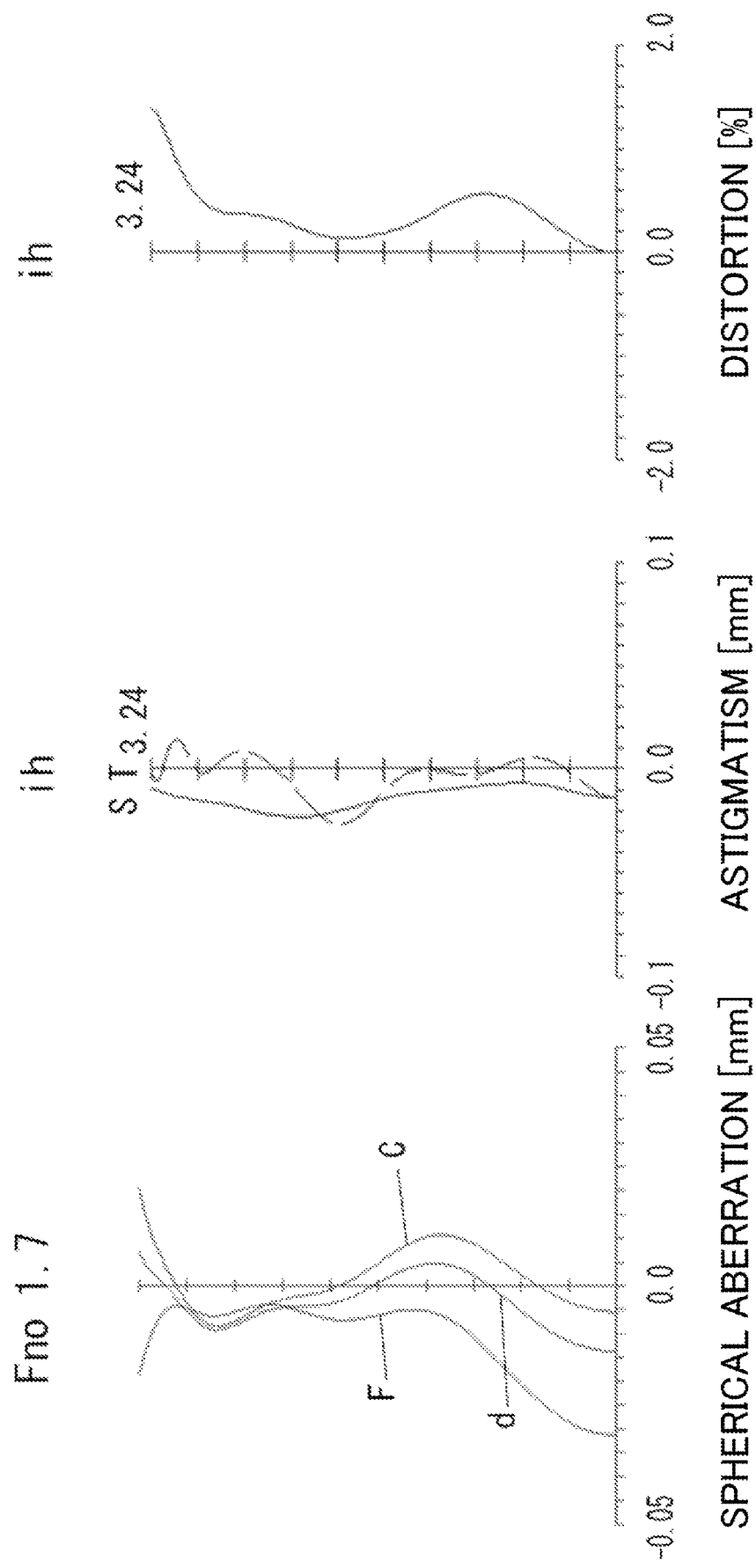
FIG. 14 shows spherical aberration, astigmatism, and distortion of the imaging lens in Example 7 according to the present invention.
Figure 15:
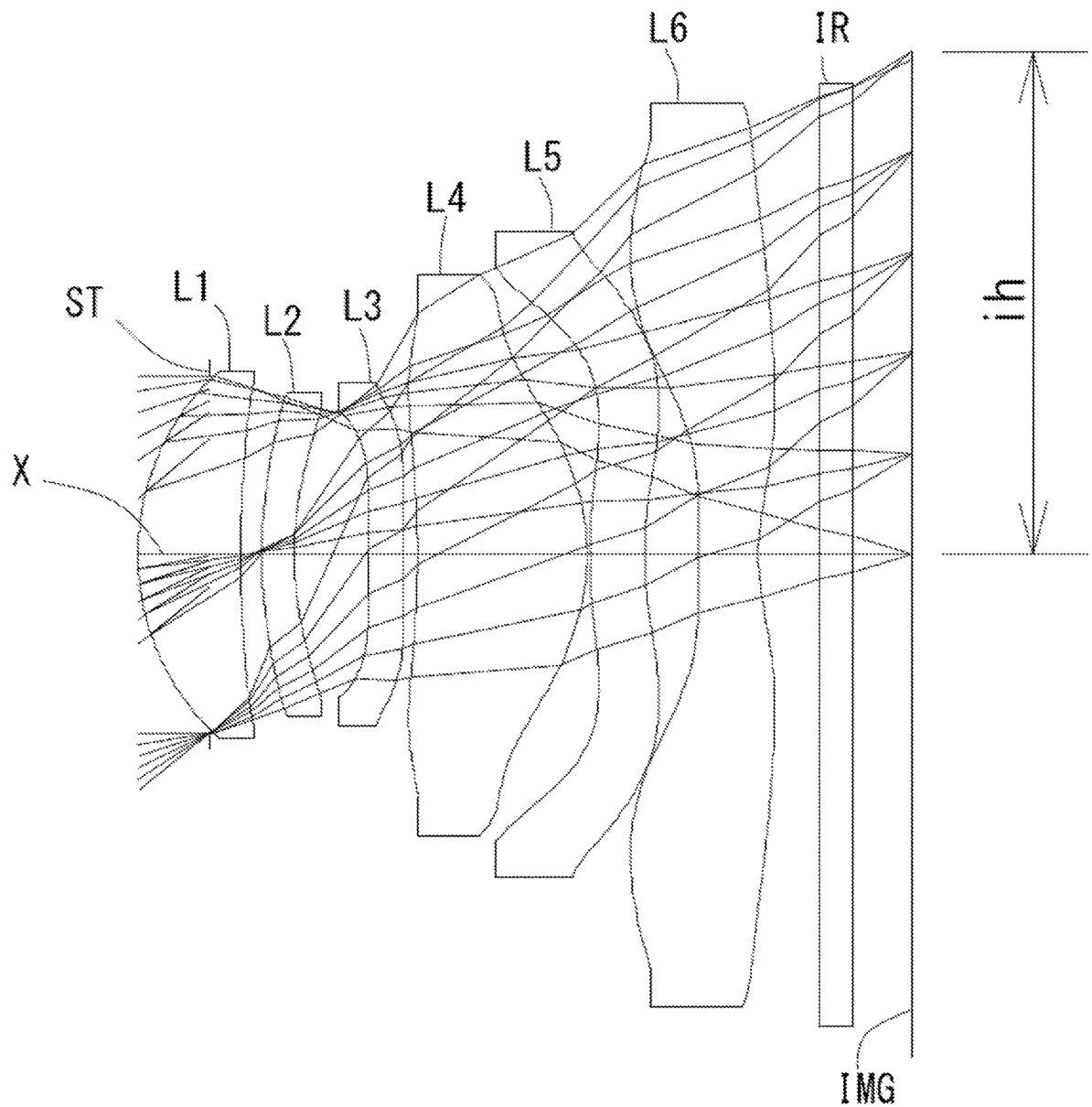
FIG. 15 is a schematic view showing a general configuration of an imaging lens in Example 8 according to the present invention.

FIG. 14 shows the spherical aberration (mm), the astigmatism (mm), and the distortion (%) of the imaging lens in Example 7.

EXAMPLE 8

The basic lens data is shown below in Table 8.

TABLE 8

Example 8
Unit mm
f = 3.93
Fno = 1.7
ω(°) = 39.0
ih = 3.24
TTL = 4.91

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.4614 | | |
| 2* | 1.6253 | 0.6591 | 1.497 | 81.56 (vd1) |
| 3* | 6.6760 | 0.1337 | | |
| 4* | 2.6379 | 0.2138 | 1.661 | 20.37 (vd2) |
| 5* | 2.1310 | 0.4785 | | |
| 6* | 25.8099 | 0.2200 | 1.661 | 20.37 (vd3) |
| 7* | 14.7258 | 0.0926 | | |
| 8* | −5.8668 | 1.0900 | 1.535 | 55.66 (vd4) |
| 9* | −1.4797 | 0.0200 | | |
| 10* | 3.6758 | 0.3500 | 1.614 | 25.58 (vd5) |
| 11* | 2.5817 | 0.3385 | | |
| 12* | 6.6705 | 0.3900 | 1.535 | 55.66 (vd6) |
| 13* | 1.4431 | 0.4000 | | |
| 14 | Infinity | 0.2100 | 1.517 | 64.20 |
| 15 | Infinity | 0.3850 | | |
| Image Plane | Infinity | | | |

Constituent Lens Data

| Lens | Start Surface | Focal Length | Composite Focal Length | |
|---|---|---|---|---|
| 1 | 2 | 4.142 | f3456 | −198.955 |
| 2 | 4 | −20.164 | | |
| 3 | 6 | −52.308 | | |
| 4 | 8 | 3.405 | | |
| 5 | 10 | −16.078 | | |
| 6 | 12 | −3.535 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 7.800591E−03 | −3.407840E−02 | −8.582655E−02 | −7.414399E−02 | −2.192804E−01 | −1.164428E−01 |
| A6 | −2.995095E−02 | 3.452281E−02 | 4.602065E−02 | 1.337299E−01 | 3.279950E−01 | −4.351808E−03 |
| A8 | 1.130016E−01 | −2.705391E−02 | −4.535713E−02 | −5.309232E−01 | −1.752863E+00 | −2.659374E−01 |
| A10 | −2.113084E−01 | 3.353857E−02 | 1.421641E−01 | 1.374112E+00 | 4.011543E+00 | 5.940008E−01 |
| A12 | 2.195444E−01 | −3.601320E−02 | −2.344296E−01 | −2.011554E+00 | −5.182123E+00 | −5.613685E−01 |
| A14 | −1.187062E−01 | 1.663238E−02 | 1.767484E−01 | 1.514661E+00 | 3.251317E+00 | 3.504071E−01 |
| A16 | 2.629057E−02 | −4.702911E−05 | −4.292545E−02 | −4.668060E−01 | −7.422448E−01 | −5.727064E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.033070E+01 | −1.000000E+00 | −1.000000E+00 | 0.000000E+00 | −8.436097E+00 |
| A4 | 4.365146E−02 | −2.689348E−01 | 1.309667E−02 | −3.433698E−02 | −4.218126E−01 | −2.060269E−01 |
| A6 | −5.149894E−02 | 2.589878E−01 | −2.562820E−01 | −1.602079E−01 | 2.722397E−01 | 1.248024E−01 |
| A8 | 4.288288E−02 | −2.146251E−01 | 2.640474E−01 | 1.481908E−01 | −8.785701E−02 | −3.987145E−02 |
| A10 | 1.432960E−02 | 1.465054E−01 | −1.511793E−01 | −7.183249E−02 | 1.670611E−02 | 7.373240E−03 |
| A12 | −2.821755E−02 | −5.730216E−02 | 4.728609E−02 | 2.024662E−02 | −1.897844E−03 | −7.925936E−04 |
| A14 | 1.111792E−02 | 1.122004E−02 | −7.469936E−03 | −3.086935E−03 | 1.196389E−04 | 4.625844E−05 |
| A16 | −1.454335E−03 | −8.767736E−04 | 4.727198E−04 | 1.962747E−04 | −3.234387E−06 | −1.142943E−06 |

The imaging lens in Example 8 satisfies conditional expressions (1) to (15) as shown in Table 13.

Figure 16:
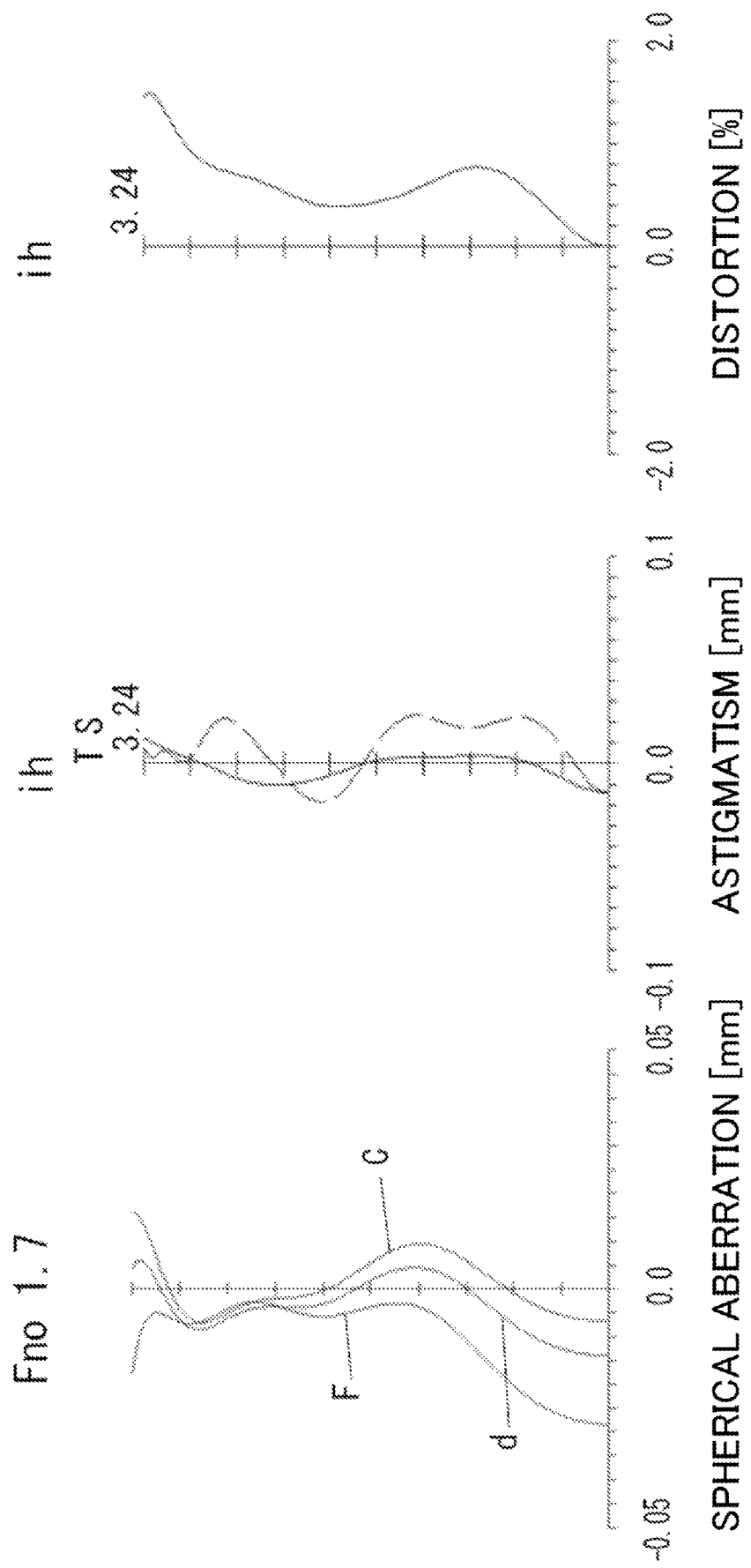
FIG. 16 shows spherical aberration, astigmatism, and distortion of the imaging lens in Example 8 according to the present invention.
Figure 17:
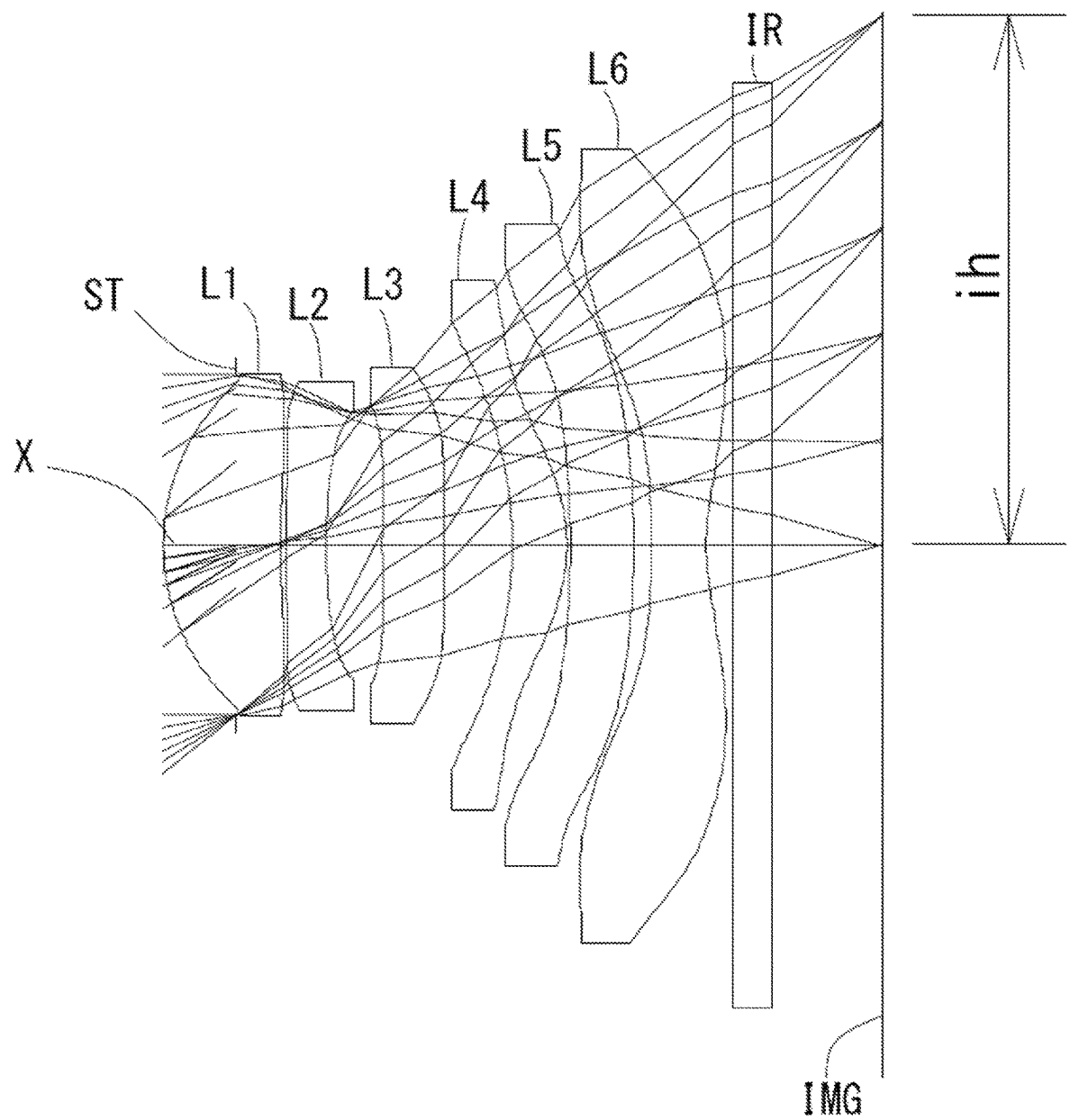
FIG. 17 is a schematic view showing the general configuration of an imaging lens in Example 9 according to the present invention.

FIG. 16 shows the spherical aberration (mm), the astigmatism (mm), and the distortion (%) of the imaging lens in Example 8.

EXAMPLE 9

The basic lens data is shown below in Table 9.

TABLE 9

Example 9
Unit mm
f = 3.44
Fno = 1.8
ω(°) = 39.3
ih = 2.90
TTL = 3.86

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.3919 | | |
| 2* | 1.1656 | 0.6397 | 1.535 | 55.66 (vd1) |
| 3* | 3.2584 | 0.0304 | | |
| 4* | 6.5160 | 0.2200 | 1.650 | 21.54 (vd2) |
| 5* | 3.3618 | 0.3075 | | |
| 6* | 10.1821 | 0.3377 | 1.535 | 55.66 (vd3) |
| 7* | 42.1600 | 0.3701 | | |
| 8* | −2.1364 | 0.3005 | 1.535 | 55.66 (vd4) |
| 9* | −0.9366 | 0.0200 | | |
| 10* | −4.6623 | 0.3433 | 1.650 | 21.54 (vd5) |
| 11* | −5.2630 | 0.0958 | | |
| 12* | −9.5614 | 0.3000 | 1.535 | 55.66 (vd6) |
| 13* | 1.3501 | 0.1508 | | |
| 14 | Infinity | 0.2100 | 1.517 | 64.20 |
| 15 | Infinity | 0.6018 | | |
| Image Plane | Infinity | | | |

Constituent Lens Data

| Lens | Start Surface | Focal Length | Composite Focal Length | |
|---|---|---|---|---|
| 1 | 2 | 3.067 | f3456 | −24.274 |
| 2 | 4 | −10.980 | | |
| 3 | 6 | 25.009 | | |
| 4 | 8 | 2.868 | | |
| 5 | 10 | −81.077 | | |
| 6 | 12 | −2.191 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.631779E−02 | −2.509354E−01 | −2.485880E−01 | −9.549074E−02 | −2.466895E−01 | −1.208887E−01 |
| A6 | 8.956181E−02 | −9.292390E−01 | −4.844860E−01 | 1.355343E+00 | 5.964034E−01 | −7.429160E−02 |
| A8 | −5.793678E−02 | 5.020344E+00 | 4.457739E+00 | −5.225218E+00 | −4.042058E+00 | −4.741214E−01 |
| A10 | −3.758986E−01 | −9.283742E+00 | −9.271641E+00 | 1.593274E+01 | 1.170946E+01 | 1.492990E+00 |
| A12 | 8.257866E−01 | 7.783348E+00 | 8.560745E+00 | −2.592894E+01 | −1.716099E+01 | −2.490921E+00 |
| A14 | −5.735678E−01 | −2.552656E+00 | −2.927530E+00 | 1.795061E+01 | 9.905019E+00 | 2.067112E+00 |
| A16 | 0.000000E+00 | 0.000000E+00 | 0.000000E+00 | 0.000000E+00 | 0.000000E+00 | −5.970312E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −3.000000E+00 | 0.000000E+00 | 0.000000E+00 | 0.000000E+00 | −1.100000E+01 |
| A4 | 6.668551E−02 | 8.395808E−02 | 1.082630E−01 | 2.624611E−02 | −3.108054E−01 | −2.001197E−01 |
| A6 | −2.964831E−01 | −5.392823E−01 | −4.725258E−01 | −2.083615E−01 | 2.619533E−01 | 1.728182E−01 |
| A8 | 9.671528E−01 | 1.395428E+00 | 8.952806E−01 | 3.559073E−01 | −1.085665E−01 | −1.106089E−01 |
| A10 | −1.562108E+00 | −1.453700E+00 | −9.692357E−01 | −3.109144E−01 | 2.791881E−02 | 4.463578E−02 |
| A12 | 1.252321E+00 | 7.488013E−01 | 5.579658E−01 | 1.403916E−01 | −4.569106E−03 | −1.065804E−02 |
| A14 | −4.786551E−01 | −1.904327E−01 | −1.579464E−01 | −3.096426E−02 | 4.379449E−04 | 1.353879E−03 |
| A16 | 6.987180E−02 | 1.900546E−02 | 1.734364E−02 | 2.647354E−03 | −1.860861E−05 | −6.972694E−05 |

The imaging lens in Example 9 satisfies conditional expressions (1) to (15) as shown in Table 13.

Figure 18:
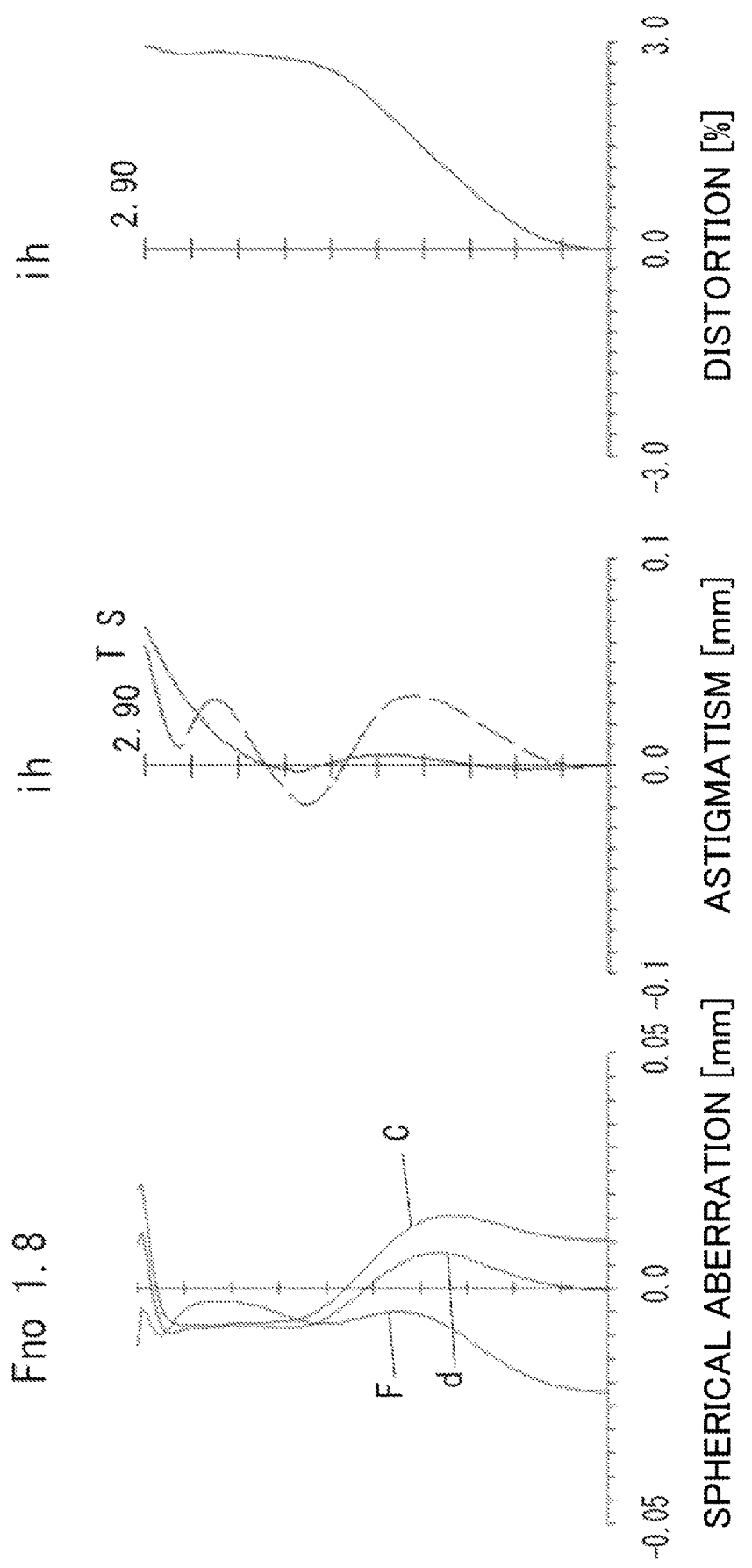
FIG. 18 shows spherical aberration, astigmatism, and distortion of the imaging lens in Example 9 according to the present invention.
Figure 19:
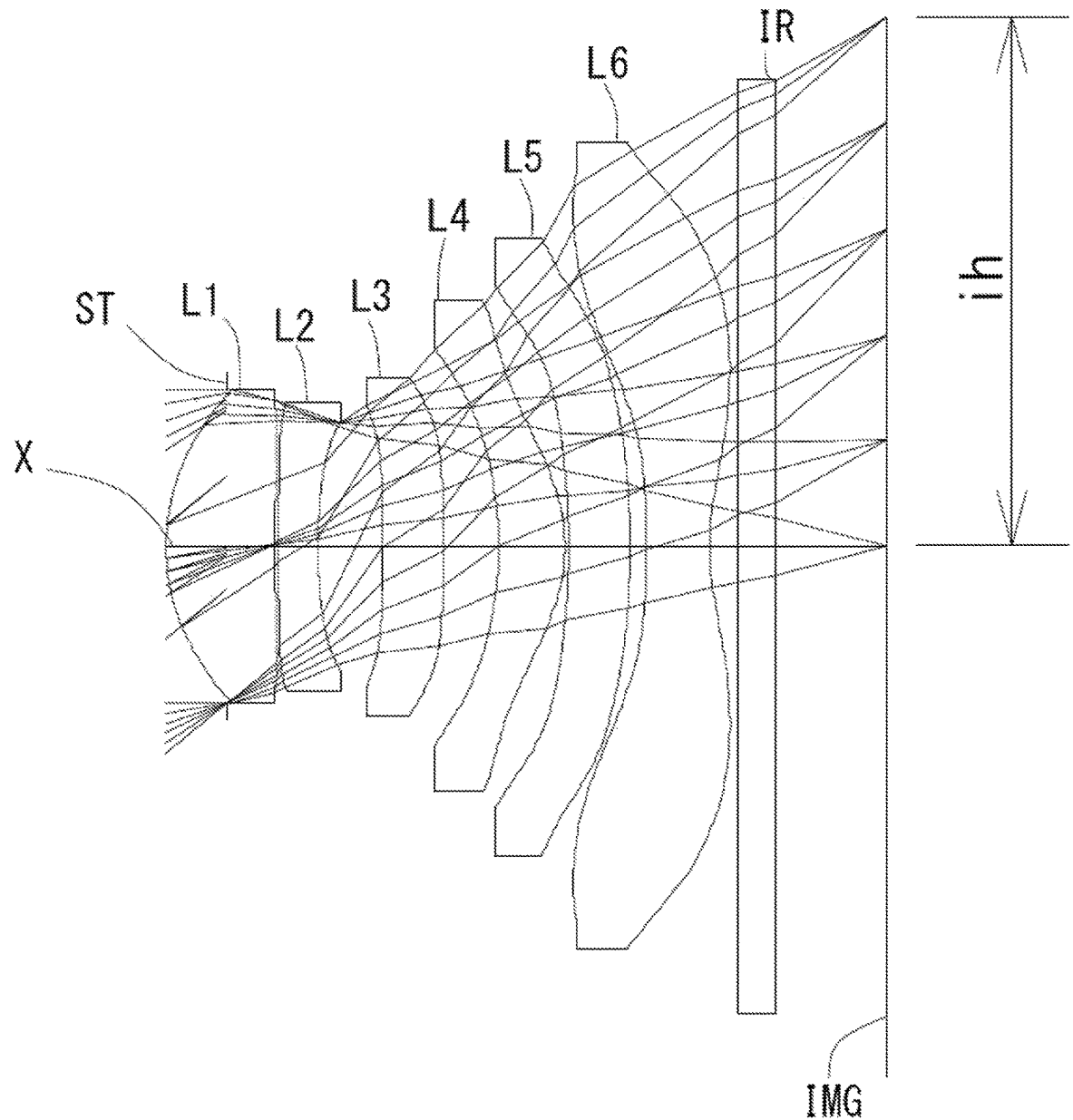
FIG. 19 is a schematic view showing the general configuration of an imaging lens in Example 10 according to the present invention.

FIG. 18 shows the spherical aberration (mm), the astigmatism (mm), and the distortion (%) of the imaging lens in Example 9.

EXAMPLE 10

The basic lens data is shown below in Table 10.

TABLE 10

Example 10
Unit mm
f = 3.44
Fno = 2.0
ω(°) = 39.3
ih = 2.80
TTL = 3.87

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.3307 | | |
| 2* | 1.1656 | 0.5915 | 1.535 | 55.66 (vd1) |
| 3* | 3.2584 | 0.0200 | | |
| 4* | 4.2192 | 0.2200 | 1.650 | 21.54 (vd2) |
| 5* | 2.8917 | 0.3502 | | |
| 6* | 64.3687 | 0.3323 | 1.535 | 55.66 (vd3) |
| 7* | −28.0162 | 0.3040 | | |
| 8* | −1.9365 | 0.3653 | 1.535 | 55.66 (vd4) |
| 9* | −0.8541 | 0.0200 | | |
| 10* | −3.6746 | 0.3331 | 1.650 | 21.54 (vd5) |
| 11* | −5.2942 | 0.0884 | | |
| 12* | −9.0064 | 0.3454 | 1.535 | 55.66 (vd6) |
| 13* | 1.3243 | 0.1508 | | |
| 14 | Infinity | 0.2100 | 1.517 | 64.20 |
| 15 | Infinity | 0.6084 | | |
| Image Plane | Infinity | | | |

Constituent Lens Data

| Lens | Start Surface | Focal Length | Composite Focal Length | |
|---|---|---|---|---|
| 1 | 2 | 3.089 | f3456 | −14.015 |
| 2 | 4 | −15.119 | | |
| 3 | 6 | 36.545 | | |
| 4 | 8 | 2.556 | | |
| 5 | 10 | −20.099 | | |
| 6 | 12 | −2.134 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.022505E−02 | −6.870573E−02 | −6.217360E−01 | −3.810617E−02 | −2.275473E−01 | −1.438132E−01 |
| A6 | 2.356933E−02 | 1.318411E+00 | 1.527953E+00 | 7.970939E−01 | 3.697978E−01 | 9.149466E−03 |
| A8 | 7.281789E−02 | −9.087701E−02 | −4.406743E−01 | −1.796880E+00 | −3.341046E+00 | −1.003509E+00 |
| A10 | −5.384696E−01 | −3.800909E+00 | −3.538117E+00 | 4.732877E+00 | 1.086985E+01 | 2.470956E+00 |
| A12 | 9.675580E−01 | 5.361136E+00 | 5.811253E+00 | −7.977381E+00 | −1.758402E+01 | −3.197994E+00 |
| A14 | −7.247154E−01 | −2.420149E+00 | −2.722500E+00 | 7.291796E+00 | 1.138492E+01 | 2.003472E+00 |
| A16 | 0.000000E+00 | 0.000000E+00 | 0.000000E+00 | 0.000000E+00 | 0.000000E+00 | −2.874541E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −3.000000E+00 | 0.000000E+00 | 0.000000E+00 | 0.000000E+00 | −1.100000E+01 |
| A4 | 3.092851E−02 | 7.469268E−02 | 1.631644E−01 | −1.689672E−02 | −3.053348E−01 | −1.838253E−01 |
| A6 | 6.038460E−02 | −3.792828E−01 | −5.773575E−01 | −1.522919E−01 | 2.629008E−01 | 1.539175E−01 |
| A8 | −2.825179E−01 | 8.990079E−01 | 1.027874E+00 | 3.456524E−01 | −1.154200E−01 | −1.006508E−01 |
| A10 | 1.400840E+00 | −8.283808E−01 | −1.018327E+00 | −3.338282E−01 | 3.276455E−02 | 4.158624E−02 |
| A12 | 1.082234E+00 | 3.386280E−01 | 5.132409E−01 | 1.569316E−01 | −6.087204E−03 | −1.012698E−02 |
| A14 | −8.986417E−02 | −4.906978E−02 | −1.195106E−01 | −3.547820E−02 | 6.702436E−04 | 1.308355E−03 |
| A16 | 1.744251E−02 | −1.458128E−03 | 9.539280E−03 | 3.103870E−03 | −3.273933E−05 | −6.843487E−05 |

The imaging lens in Example 10 satisfies conditional expressions (1) to (15) as shown in Table 13.

Figure 20:
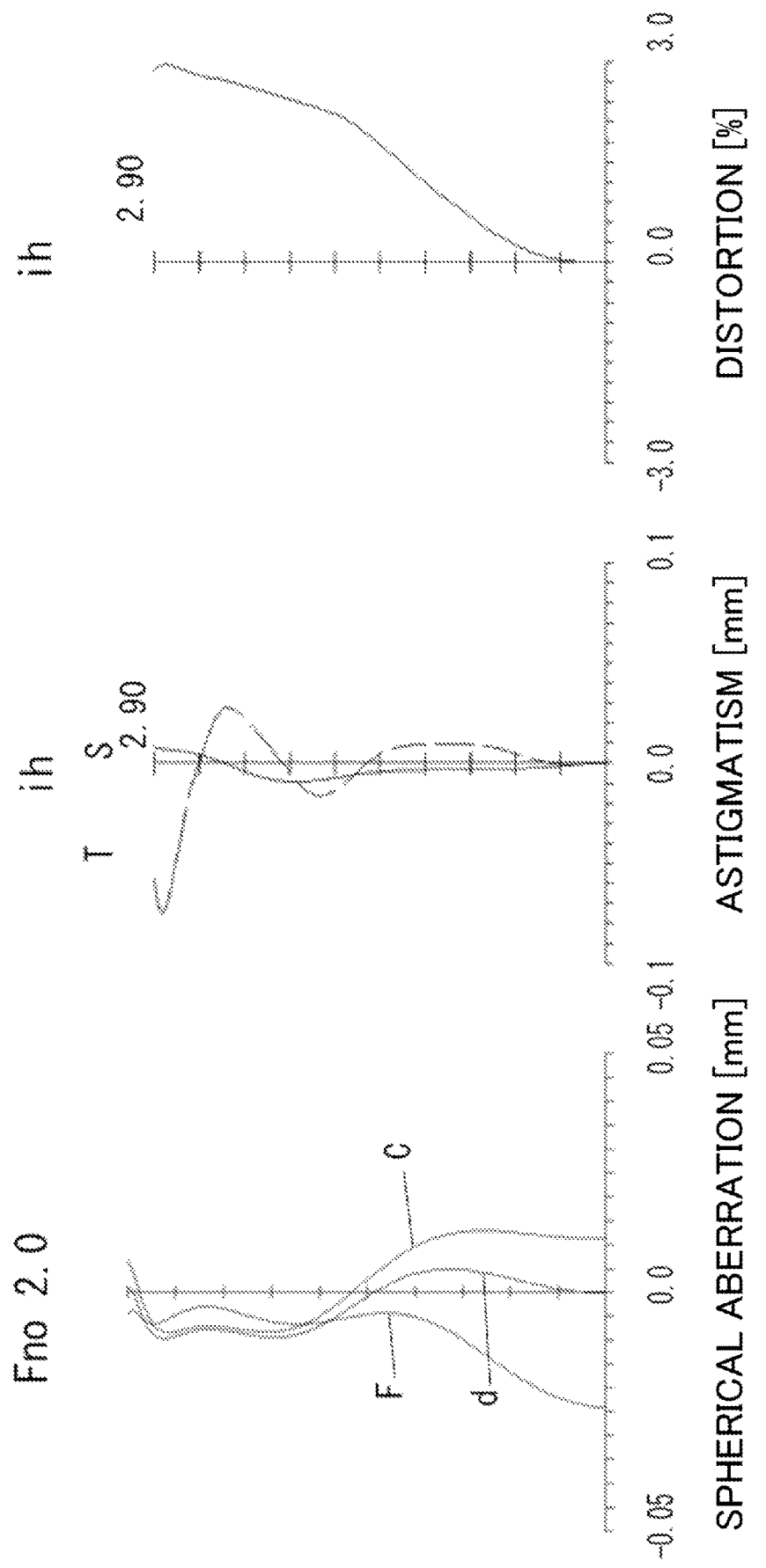
FIG. 20 shows spherical aberration, astigmatism, and distortion of the imaging lens in Example 10 according to the present invention.
Figure 21:
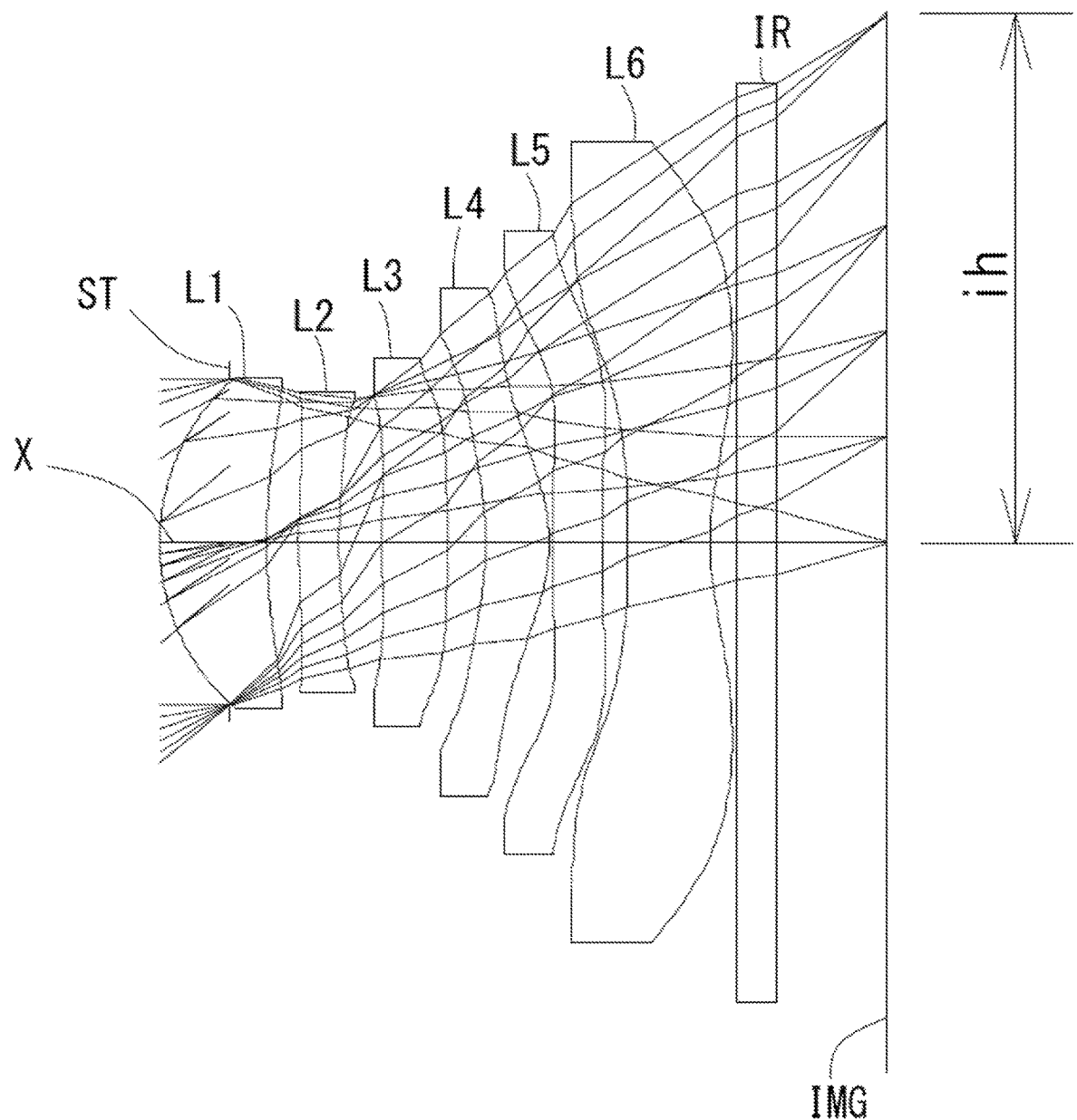
FIG. 21 is a schematic view showing the general configuration of an imaging lens in Example 11 according to the present invention.

FIG. 20 shows the spherical aberration (mm), the astigmatism (mm), and the distortion (%) of the imaging lens in Example 10.

EXAMPLE 11

The basic lens data is shown below in Table 11.

TABLE 11

Example 11
Unit mm
f = 3.36
Fno = 1.9
ω(°) = 40.4
ih = 2.90
TTL = 3.93

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.3792 | | |
| 2* | 1.2242 | 0.5914 | 1.497 | 81.55 (vd1) |
| 3* | 3.2654 | 0.1744 | | |
| 4* | 4.5104 | 0.2200 | 1.650 | 21.54 (vd2) |
| 5* | 3.2913 | 0.2377 | | |
| 6* | 11.4566 | 0.3561 | 1.535 | 55.66 (vd3) |
| 7* | −20.5659 | 0.2138 | | |
| 8* | −1.8909 | 0.3500 | 1.535 | 55.66 (vd4) |
| 9* | −0.9940 | 0.0200 | | |
| 10* | Infinity | 0.2750 | 1.650 | 21.54 (vd5) |
| 11* | Infinity | 0.1382 | | |
| 12* | −8.9115 | 0.4500 | 1.535 | 55.66 (vd6) |
| 13* | 1.4807 | 0.1508 | | |
| 14 | Infinity | 0.2100 | 1.517 | 64.20 |
| 15 | Infinity | 0.6172 | | |
| Image Plane | Infinity | | | |

Constituent Lens Data

| Lens | Start Surface | Focal Length | Composite Focal Length | |
|---|---|---|---|---|
| 1 | 2 | 3.595 | f3456 | −177.234 |
| 2 | 4 | −20.158 | | |
| 3 | 6 | 13.811 | | |
| 4 | 8 | 3.449 | | |
| 5 | 10 | Infinity | | |
| 6 | 12 | −2.339 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 2.853323E−03 | −6.542153E−02 | −2.346937E−01 | −1.445645E−01 | −1.056966E−01 | −9.367614E−02 |
| A6 | 9.722830E−03 | 1.115535E−01 | 4.000772E−01 | 1.885260E−01 | −3.779418E−01 | 1.686798E−01 |
| A8 | −1.741557E−02 | −4.093871E−01 | −1.425189E+00 | −5.925904E−01 | 1.204380E+00 | −8.543157E−01 |
| A10 | 7.896126E−02 | 9.059203E−01 | 3.460904E+00 | 2.526849E+00 | −2.751107E+00 | 1.244950E+00 |
| A12 | −8.265374E−02 | −1.047643E+00 | −4.179792E+00 | −4.030044E+00 | 3.544737E+00 | −1.452755E+00 |
| A14 | 4.084531E−02 | 4.400629E−01 | 1.919045E+00 | 2.493209E+00 | −1.713108E+00 | 1.389702E+00 |
| A16 | 0.000000E+00 | 0.000000E+00 | 0.000000E+00 | 0.000000E+00 | 0.000000E+00 | −5.285055E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −3.000000E+00 | 0.000000E+00 | 0.000000E+00 | 0.000000E+00 | −1.100000E+01 |
| A4 | −2.908666E−03 | 6.878398E−02 | 2.449628E−01 | 2.164858E−01 | −9.559675E−02 | −1.230986E−01 |
| A6 | 1.042669E+00 | 1.825134E−01 | −5.556753E−01 | −4.458299E−01 | −3.573676E−02 | 5.582625E−02 |
| A8 | −2.136300E+00 | −1.721635E−01 | 3.287377E−01 | 2.712478E−01 | 8.617697E−02 | −1.146591E−02 |
| A10 | 1.771914E+00 | −7.702910E−03 | −9.215944E−02 | −7.211561E−02 | −4.258342E−02 | −1.115224E−03 |
| A12 | −6.770531E−01 | 6.895284E−02 | 3.137494E−02 | 7.372614E−03 | 9.839882E−03 | 8.189923E−04 |
| A14 | 1.077886E−01 | −3.043831E−02 | −1.227632E−02 | 1.476141E−04 | −1.116036E−03 | −1.158143E−04 |
| A16 | −4.022856E−03 | 3.995977E−03 | 1.864776E−03 | −5.108027E−05 | 4.985992E−05 | 5.325158E−06 |

The imaging lens in Example 11 satisfies conditional expressions (1) to (15) as shown in Table 13.

Figure 22:
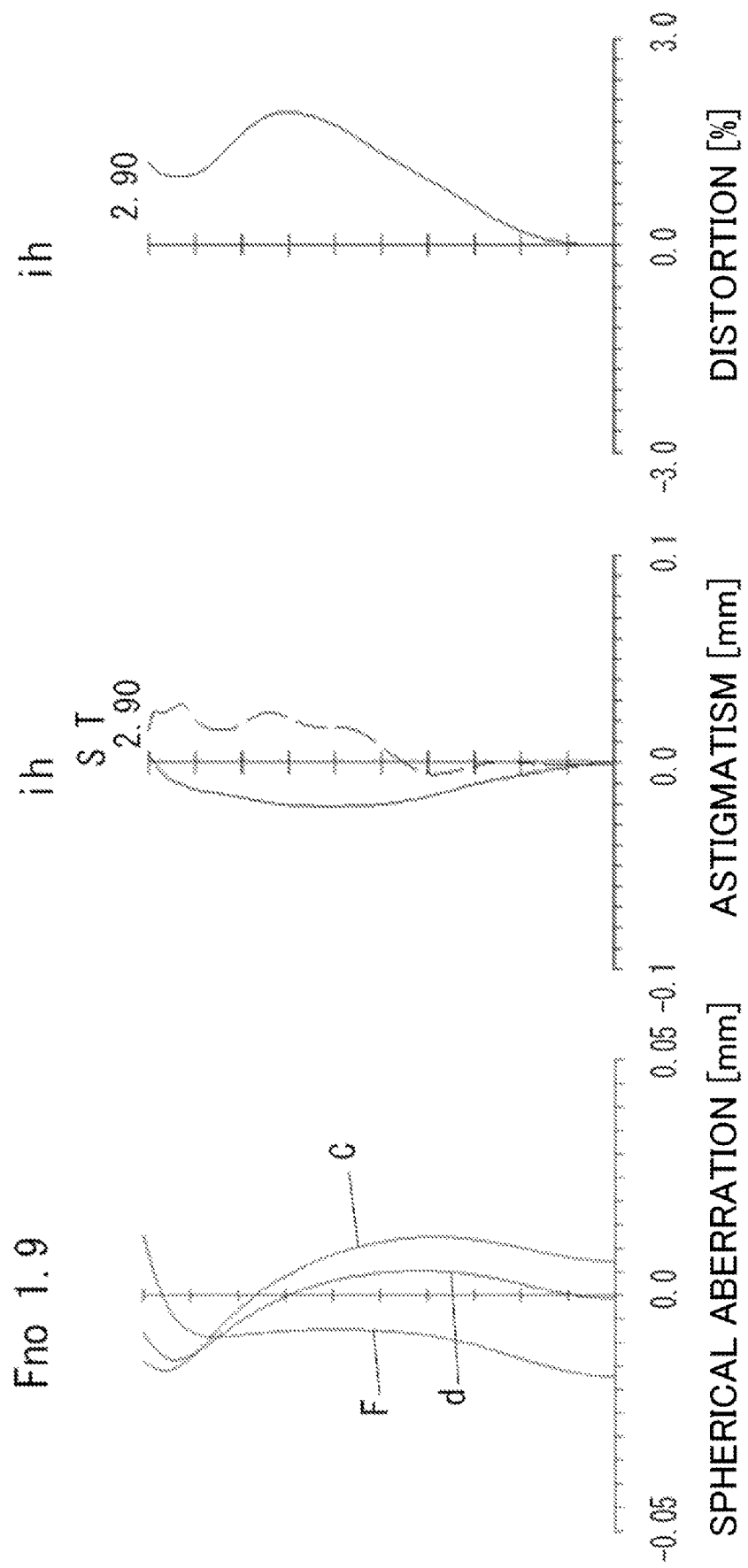
FIG. 22 shows spherical aberration, astigmatism, and distortion of the imaging lens in Example 11 according to the present invention.
Figure 23:
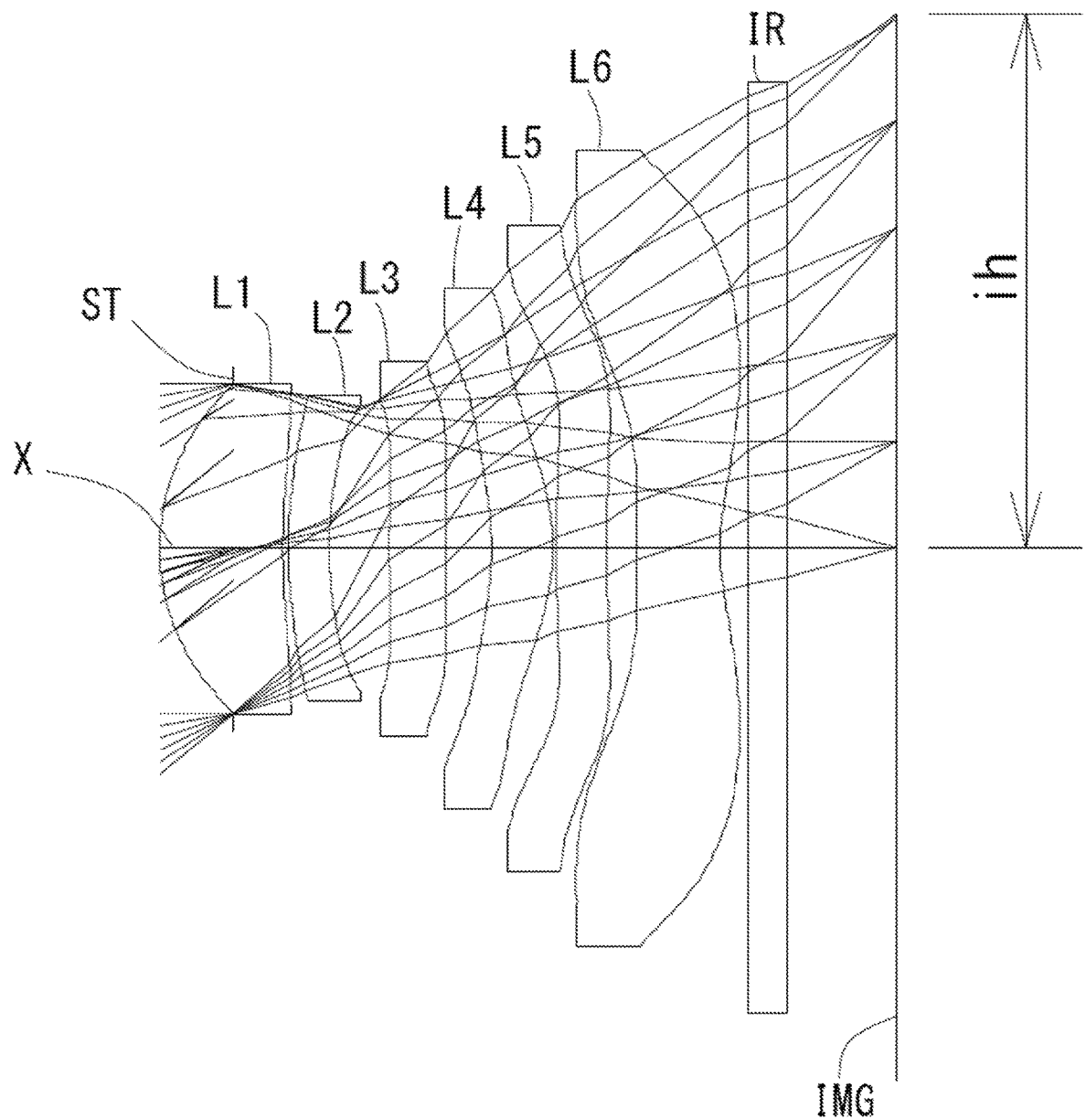
FIG. 23 is a schematic view showing the general configuration of an imaging lens in Example 12 according to the present invention.

FIG. 22 shows the spherical aberration (mm), the astigmatism (mm), and the distortion (%) of the imaging lens in Example 11.

EXAMPLE 12

The basic lens data is shown below in Table 12.

TABLE 12

Example 12
Unit mm
f = 3.47
Fno = 1.8
ω(°) = 39.2
ih = 2.90
TTL = 3.93

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.4116 | | |
| 2* | 1.1656 | 0.6700 | 1.439 | 94.95 (vd1) |
| 3* | 3.2584 | 0.0323 | | |
| 4* | 2.4999 | 0.2200 | 1.650 | 21.54 (vd2) |
| 5* | 2.2840 | 0.3256 | | |
| 6* | 7.1913 | 0.3076 | 1.535 | 55.66 (vd3) |
| 7* | 13.3005 | 0.2437 | | |
| 8* | −2.0572 | 0.3377 | 1.535 | 55.66 (vd4) |
| 9* | −1.1708 | 0.0200 | | |
| 10* | Infinity | 0.2750 | 1.650 | 21.54 (vd5) |
| 11* | Infinity | 0.1618 | | |
| 12* | 52.8885 | 0.4500 | 1.535 | 55.66 (vd6) |
| 13* | 1.4558 | 0.1508 | | |
| 14 | Infinity | 0.2100 | 1.517 | 64.20 |
| 15 | Infinity | 0.6010 | | |
| Image Plane | Infinity | | | |

Constituent Lens Data

| Lens | Start Surface | Focal Length | Composite Focal Length | |
|---|---|---|---|---|
| 1 | 2 | 3.769 | f3456 | −17.156 |
| 2 | 4 | −67.970 | | |
| 3 | 6 | 28.770 | | |
| 4 | 8 | 4.485 | | |
| 5 | 10 | Infinity | | |
| 6 | 12 | −2.808 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 8.863280E−03 | −2.704228E−01 | −2.474858E−01 | −6.197325E−02 | −1.698988E−01 | −9.159046E−02 |
| A6 | −1.410589E−01 | 2.542842E−01 | 2.855587E−01 | 4.321159E−01 | 9.625543E−03 | 1.353374E−01 |
| A8 | 5.800478E−01 | 7.555125E−01 | 5.367667E−01 | −1.892535E+00 | −4.083891E−01 | −1.205936E+00 |
| A10 | −1.281237E+00 | −2.506911E+00 | −1.616293E+00 | 6.925819E+00 | 4.810476E−01 | 3.022889E+00 |
| A12 | 1.395876E+00 | 2.466285E+00 | 1.239330E+00 | −1.165431E+01 | −1.954338E−02 | −4.806486E+00 |
| A14 | −6.265311E−01 | −8.611065E−01 | −1.685844E−01 | 7.696204E+00 | −1.241528E−01 | 4.232884E+00 |
| A16 | 0.000000E+00 | 0.000000E+00 | 0.000000E+00 | 0.000000E+00 | 0.000000E+00 | −1.429458E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −3.000000E+00 | 0.000000E+00 | 0.000000E+00 | 0.000000E+00 | −1.100000E+01 |
| A4 | 2.198821E−02 | 1.159443E−01 | 2.907981E−01 | 2.071839E−01 | −2.981961E−01 | −1.577371E−01 |
| A6 | 6.632746E−01 | −1.255641E−01 | −7.384701E−01 | −4.717640E−01 | 1.672173E−01 | 8.470233E−02 |
| A8 | −1.243639E+00 | 2.494593E−01 | 7.088927E−01 | 3.801695E−01 | −1.884700E−02 | −2.783221E−02 |
| A10 | 8.065024E−01 | −1.763941E−01 | −4.839720E−01 | −1.881558E−01 | −1.204049E−02 | 4.587396E−03 |
| A12 | −1.890639E−01 | 1.121539E−02 | 2.408469E−01 | 6.286589E−02 | 4.949415E−03 | −2.356925E−04 |
| A14 | 4.038676E−02 | 2.839229E−02 | −6.863161E−02 | −1.237241E−02 | −7.391617E−04 | −4.023743E−05 |
| A16 | −1.973331E−02 | −7.525058E−03 | 7.925794E−03 | 1.032907E−03 | 4.119562E−05 | 5.595620E−06 |

The imaging lens in Example 12 satisfies conditional expressions (1) to (15) as shown in Table 13.

Figure 24:
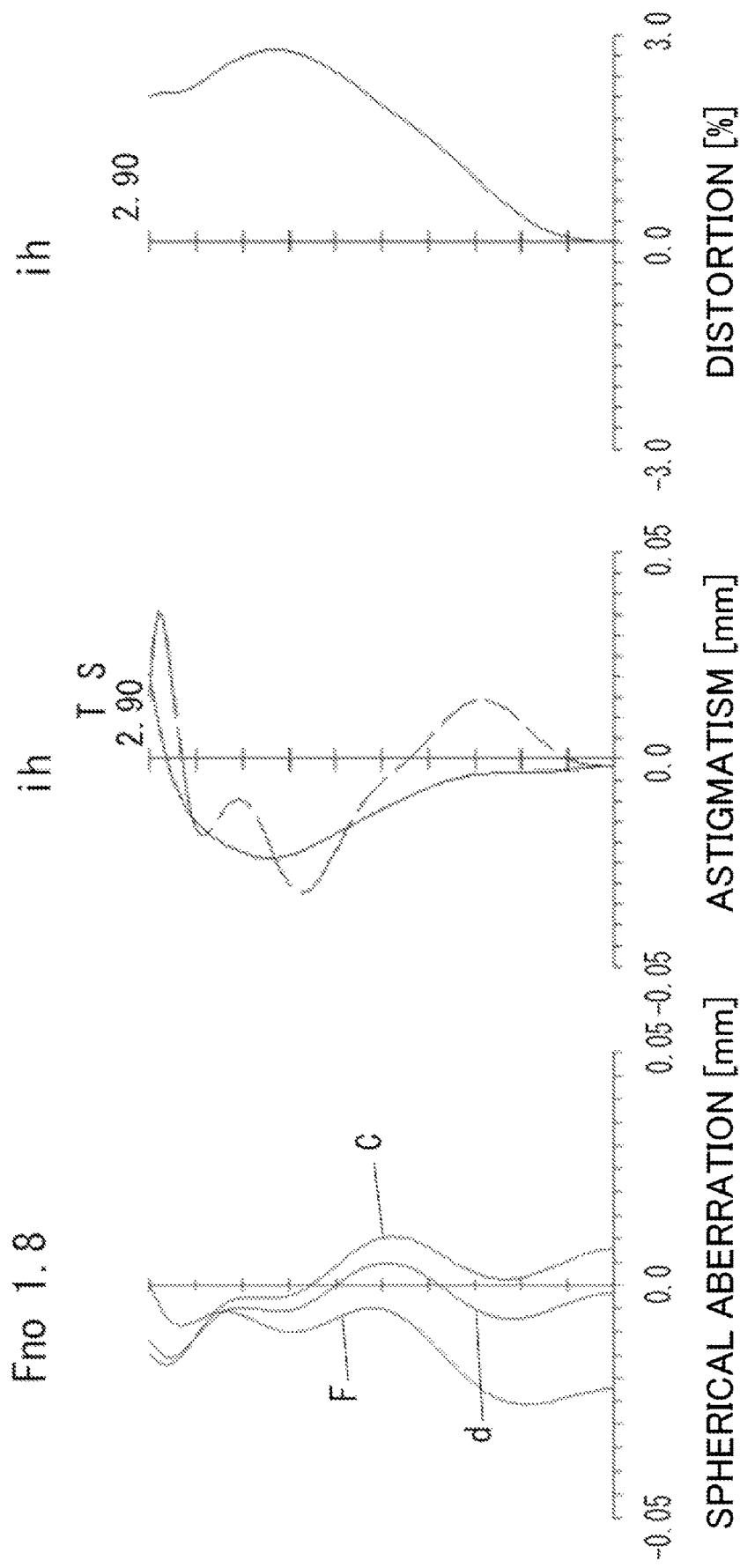
FIG. 24 shows spherical aberration, astigmatism, and distortion of the imaging lens in Example 12 according to the present invention.

FIG. 24 shows the spherical aberration (mm), the astigmatism (mm), and the distortion (%) of the imaging lens in Example 12.

In table 13, values of conditional expressions (1) to (15) related to the Examples 1 to 12 are shown.

TABLE 13

| Conditional expression | | Example1 | Example2 | Example3 | Example4 | Example5 | Example6 |
|---|---|---|---|---|---|---|---|
| (1) | (D2/f2) × 100 | −0.13 | −0.26 | −0.52 | −1.04 | −0.14 | −0.32 |
| (2) | (T4/f) × 100 | 0.61 | 0.51 | 0.51 | 0.51 | 0.87 | 0.51 |
| (3) | vd5/vd6 | 0.46 | 0.46 | 0.46 | 0.46 | 0.46 | 0.46 |
| (4) | f1/f2 | −0.02 | −0.05 | −0.10 | −0.19 | −0.02 | −0.05 |
| (5) | (T3/f) × 100 | 0.81 | 1.36 | 1.29 | 1.50 | 1.24 | 0.96 |
| (6) | f2/f | −51.32 | −20.68 | −10.31 | −5.16 | −50.50 | −20.45 |
| (7) | |f3|/f | 2.54 | 3.45 | 4.78 | 12.37 | 7.29 | 5.49 |
| (8) | r1/r2 | 0.31 | 0.29 | 0.28 | 0.24 | 0.34 | 0.31 |
| (9) | r3/r4 | 1.06 | 1.12 | 1.21 | 1.43 | 1.07 | 1.09 |
| (10) | |r2|/f | 1.33 | 1.46 | 1.47 | 1.73 | 1.13 | 1.27 |
| (11) | r3/f | 0.81 | 1.35 | 1.31 | 1.38 | 0.59 | 0.66 |
| (12) | f3456/t | −3.11 | −4.15 | −5.00 | −7.34 | −3.80 | −5.92 |
| (13) | f1/f4 | 1.13 | 1.27 | 1.13 | 1.11 | 1.23 | 1.36 |
| (14) | f4/f | 0.90 | 0.80 | 0.88 | 0.87 | 0.88 | 0.80 |
| (15) | T2/T4 | 16.78 | 24.30 | 25.07 | 21.77 | 13.19 | 24.96 |

| Conditional expression | | Example7 | Example8 | Example9 | Example10 | Example11 | Example12 |
|---|---|---|---|---|---|---|---|
| (1) | (D2/f2) × 100 | −0.56 | −1.06 | −2.00 | −1.46 | −1.09 | −0.32 |
| (2) | (T4/f) × 100 | 0.51 | 0.51 | 0.58 | 0.58 | 0.60 | 0.58 |
| (3) | vd5/vd6 | 0.46 | 0.46 | 0.39 | 0.39 | 0.39 | 0.39 |
| (4) | f1/f2 | −0.11 | −0.21 | −0.28 | −0.20 | −0.18 | −0.06 |
| (5) | (T3/f) × 100 | 0.87 | 2.36 | 10.75 | 8.83 | 6.36 | 7.02 |
| (6) | f2/f | −10.25 | −5.13 | −3.19 | −4.39 | −6.00 | −19.59 |
| (7) | |f3|/f | 6.26 | 13.32 | 7.26 | 10.61 | 4.11 | 8.29 |
| (8) | r1/r2 | 0.29 | 0.24 | 0.36 | 0.36 | 0.37 | 0.36 |
| (9) | r3/r4 | 1.14 | 1.24 | 1.94 | 1.46 | 1.37 | 1.09 |
| (10) | |r2|f | 1.41 | 1.70 | 0.95 | 0.95 | 0.97 | 0.94 |
| (11) | r3/f | 0.65 | 0.67 | 1.89 | 1.23 | 1.34 | 0.72 |
| (12) | f3456/f | −9.12 | −50.66 | −7.05 | −4.07 | −52.76 | −4.94 |
| (13) | f1/f4 | 1.26 | 1.22 | 1.07 | 1.21 | 1.04 | 0.84 |
| (14) | f4/f | 0.87 | 0.87 | 0.83 | 0.74 | 1.03 | 1.29 |
| (15) | T2/T4 | 24.32 | 23.93 | 15.38 | 17.51 | 11.88 | 16.28 |

When the imaging lens according to the present invention is adopted to a product with the camera function, contribution is made to the wide field of view, the low-profileness and the low F-number of the camera and high performance thereof is achieved.

DESCRIPTION OF REFERENCE NUMERALS

ST: aperture stop,
L1: first lens,
L2: second lens,
L3: third lens,
L4: fourth lens,
L5: fifth lens,
L6: sixth lens,
ih: maximum image height,
IR: filter, and
IMG: image plane.

What is claimed is:

1. An imaging lens comprising, in order from an object side to an image side,
   a first lens having positive refractive power and a convex surface facing the object side near an optical axis,
   a second lens having the convex surface facing the object side near the optical axis,
   a third lens,
   a fourth lens,
   a fifth lens, and
   a sixth lens having negative refractive power and a concave surface facing an image side near the optical axis, wherein said second lens has negative refractive power near the optical axis, said third lens has the negative refractive power near the optical axis, said fourth lens has the positive refractive power near the optical axis, and below conditional expressions (1), (2), and (7) are satisfied:

$$-3.00 < (D2/f2) \times 100 < -0.05 \quad (1)$$

$$0.25 < (T4/f) \times 100 < 1.00 \quad (2)$$

$$1 < |f3|/f < 20 \quad (7)$$

where
D2: thickness along the optical axis of the second lens,
f2: focal length of the second lens,
f3: focal length of the third lens,
T4: distance along the optical axis from the image-side surface of the fourth lens to the object-side surface of the fifth lens, and
f: focal length of the overall optical system of the imaging lens.

2. The imaging lens according to claim 1, wherein an object-side surface of said fifth lens has the convex surface facing the object side near the optical axis.

3. The imaging lens according to claim 1, wherein an object-side surface of said sixth lens has the convex surface facing the object side near the optical axis, and is formed as an aspheric surface having at least one off-axial pole point.

4. The imaging lens according to claim 1, wherein a below conditional expression (3) is satisfied:

$$0.15 < vd5/vd6 < 0.70 \tag{3}$$

where
vd5: abbe number at d-ray of the fifth lens, and
vd6: abbe number at d-ray of the sixth lens.

5. The imaging lens according to claim 1, wherein a below conditional expression (5) is satisfied:

$$0.4 < (T3/f) \times 100 < 14.0 \tag{5}$$

where
T3: distance along the optical axis from the image-side surface of the third lens to the object-side surface of the fourth lens, and
f: focal length of the overall optical system of the imaging lens.

6. The imaging lens according to claim 1, wherein a below conditional expression (6) is satisfied:

$$-77.0 < f2/f < -1.4 \tag{6}$$

where
f2: focal length of the second lens, and
f: focal length of the overall optical system of the imaging lens.

7. The imaging lens according to claim 1, wherein a below conditional expression (8) is satisfied:

$$0.1 < r1/r2 < 0.6 \tag{8}$$

where
r1: paraxial curvature radius of the object-side surface of the first lens, and
r2: paraxial curvature radius of the image-side surface of the first lens.

8. The imaging lens according to claim 1, wherein a below conditional expression (9) is satisfied:

$$0.5 < r3/r4 < 3.0 \tag{9}$$

where
r3: paraxial curvature radius of the object-side surface of the second lens, and
r4: paraxial curvature radius of the image-side surface of the second lens.

9. The imaging lens according to claim 1, wherein a below conditional expression (10) is satisfied:

$$0.4 < |r2|/f < 2.6 \tag{10}$$

where
r2: paraxial curvature radius of the image-side surface of the first lens, and
f: focal length of the overall optical system of the imaging lens.

10. The imaging lens according to claim 1, wherein a below conditional expression (11) is satisfied:

$$0.25 < r3/f < 2.50 \tag{11}$$

where
r3: paraxial curvature radius of the object-side surface of the second lens, and
f: focal length of the overall optical system of the imaging lens.

11. An imaging lens comprising, in order from an object side to an image side,
  a first lens having positive refractive power and a convex surface facing the object side near an optical axis,
  a second lens having the convex surface facing the object side near the optical axis,
  a third lens,
  a fourth lens,
  a fifth lens having the convex surface facing the object side near the optical axis, and
  a sixth lens having negative refractive power and a concave surface facing the image side near the optical axis, wherein below conditional expressions (2), (3), (4), (7), and (11) are satisfied:

$$0.25 < (T4/f) \times 100 < 1.00 \tag{2}$$

$$0.15 < vd5/vd6 < 0.70 \tag{3}$$

$$-0.36 < f1/f2 < 0.00 \tag{4}$$

$$1 < |f3|/f < 20 \tag{7}$$

$$0.25 < r3/f < 2.50 \tag{1}$$

where
T4: distance along the optical axis from the image-side surface of the fourth lens to the object-side surface of the fifth lens,
f: focal length of the overall optical system of the imaging lens,
vd5: abbe number at d-ray of the fifth lens,
vd6: abbe number at d-ray of the sixth lens,
f1: focal length of the first lens, and
f2: focal length of the second lens.
f3: focal length of the third lens, and
r3: paraxial curvature radius of the object-side surface of the second lens.

12. The imaging lens according to claim 11, wherein a below conditional expression (1) is satisfied:

$$-3.00 < (D2/f2) \times 100 < -0.05 \tag{1}$$

where
D2: thickness along the optical axis of the second lens, and
f2: focal length of the second lens.

13. The imaging lens according to claim 11, wherein a below conditional expression (5) is satisfied:

$$0.4 < (T3/f) \times 100 < 14.0 \tag{5}$$

where
T3: distance along the optical axis from the image-side surface of the third lens to the object-side surface of the fourth lens, and
f: focal length of the overall optical system of the imaging lens.

14. The imaging lens according to claim 11, wherein a below conditional expression (6) is satisfied:

$$-77.0 < f2/f < -1.4 \tag{6}$$

where
f2: focal length of the second lens, and
f: focal length of the overall optical system of the imaging lens.

15. The imaging lens according to claim 11, wherein a below conditional expression (8) is satisfied:

$$0.1 < r1/r2 < 0.6 \tag{8}$$

where
r1: paraxial curvature radius of the object-side surface of the first lens, and
r2: paraxial curvature radius of the image-side surface of the first lens.

16. The imaging lens according to claim 11, wherein a below conditional expression (9) is satisfied:

$$0.5 < r3/r4 < 3.0 \tag{9}$$

where r3: paraxial curvature radius of the object-side surface of the second lens, and r4: paraxial curvature radius of the image-side surface of the second lens.

17. The imaging lens according to claim 11, wherein a below conditional expression (10) is satisfied:

$$0.4 < |r2|/f < 2.6 \tag{10}$$

where r2: paraxial curvature radius of the image-side surface of the first lens, and f: focal length of the overall optical system of the imaging lens.

\* \* \* \* \*